United States Patent
Hathorn et al.

(10) Patent No.: US 9,892,065 B2
(45) Date of Patent: *Feb. 13, 2018

(54) ADJUSTMENTS OF BUFFER CREDITS FOR OPTIMIZING THE NUMBER OF RETRY OPERATIONS AND TRANSFER READY OPERATIONS

(71) Applicant: INTERNATIONAL BUSINESS MACHINES CORPORATION, Armonk, NY (US)

(72) Inventors: Roger G. Hathorn, Tucson, AZ (US); Bret W. Holley, Tucson, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 104 days.

This patent is subject to a terminal disclaimer.

(21) Appl. No.: 14/717,716

(22) Filed: May 20, 2015

(65) Prior Publication Data

US 2016/0342391 A1 Nov. 24, 2016

(51) Int. Cl.
| G06F 5/12 | (2006.01) |
| G06F 13/12 | (2006.01) |
| G06F 3/06 | (2006.01) |
| G06F 13/36 | (2006.01) |
| H04L 12/801 | (2013.01) |

(Continued)

(52) U.S. Cl.
CPC ............ *G06F 13/126* (2013.01); *G06F 3/067* (2013.01); *G06F 3/0613* (2013.01); *G06F 3/0656* (2013.01); *G06F 5/12* (2013.01); *G06F 13/1642* (2013.01); *G06F 13/1673* (2013.01); *G06F 13/36* (2013.01); *G06F 13/4027* (2013.01); *H04L 47/39* (2013.01); *G06F 2003/0691* (2013.01); *G06F 2205/126* (2013.01); *G06F 2213/0008* (2013.01)

(58) Field of Classification Search
None
See application file for complete search history.

(56) References Cited

U.S. PATENT DOCUMENTS 6,078,990 A * 6/2000 Frazier .................. G06F 3/0605
711/114
6,081,812 A * 6/2000 Boggs .................. G06F 11/008

(Continued)

FOREIGN PATENT DOCUMENTS

| CA | 1183273 A * | 2/1985 | ........... G06F 13/126 |
| CN | 103139098 A | 6/2013 | |
| WO | 2005081744 | 9/2005 | |

OTHER PUBLICATIONS

'Fibre Channel Buffer Credits and Frame Management' White Paper, copyright 2016, Brocade Communication Systems.*

(Continued)

*Primary Examiner* — Steven Snyder
(74) *Attorney, Agent, or Firm* — Rabindranath Dutta; Konrad Raynes Davda & Victor LLP

(57) ABSTRACT

A control unit monitors a number of transfer ready operations and a number of retry operations during a monitoring period during communication with a plurality of channels. Based, on the monitoring, a number of buffer credits for communication with the plurality of channels is adjusted.

21 Claims, 25 Drawing Sheets

(51) Int. Cl.
*G06F 13/16* (2006.01)
*G06F 13/40* (2006.01)

(56) References Cited

U.S. PATENT DOCUMENTS

| | | | | |
|---|---|---|---|---|
| 6,105,122 A * | 8/2000 | Muller | G06F 15/17 | |
| | | | | 345/472 |
| 6,148,349 A * | 11/2000 | Chow | G06F 15/17375 | |
| | | | | 709/214 |
| 6,247,077 B1 * | 6/2001 | Muller | G06F 15/17375 | |
| | | | | 710/74 |
| 6,256,740 B1 * | 7/2001 | Muller | H04L 29/12009 | |
| | | | | 726/12 |
| 6,279,057 B1 * | 8/2001 | Westby | G06F 3/0619 | |
| | | | | 710/52 |
| 6,289,386 B1 | 9/2001 | Vangemert | | |
| 6,337,865 B1 | 1/2002 | Seto et al. | | |
| 6,356,944 B1 * | 3/2002 | McCarty | G06F 13/126 | |
| | | | | 709/222 |
| 6,502,189 B1 * | 12/2002 | Westby | G06F 3/0619 | |
| | | | | 710/52 |
| 6,553,036 B1 * | 4/2003 | Miller | H04L 12/5602 | |
| | | | | 370/235 |
| 6,594,698 B1 * | 7/2003 | Chow | G06F 9/5011 | |
| | | | | 709/219 |
| 6,711,632 B1 * | 3/2004 | Chow | G06F 12/0804 | |
| | | | | 709/237 |
| 6,766,388 B2 * | 7/2004 | Gerhart | G06F 3/0613 | |
| | | | | 710/29 |
| 6,836,862 B1 * | 12/2004 | Erekson | H04L 1/24 | |
| | | | | 714/704 |
| 7,215,680 B2 * | 5/2007 | Mullendore | H04L 12/5693 | |
| | | | | 370/412 |
| 7,248,587 B1 * | 7/2007 | Sharma | H04L 41/0663 | |
| | | | | 370/394 |
| 7,441,055 B2 * | 10/2008 | Wagh | G06F 13/4059 | |
| | | | | 710/29 |
| 7,443,794 B2 | 10/2008 | George et al. | | |
| 7,453,878 B1 * | 11/2008 | Martin | H04L 45/24 | |
| | | | | 370/231 |
| 7,480,293 B2 | 1/2009 | Betker | | |
| 7,484,058 B2 * | 1/2009 | Frey | G06F 3/0607 | |
| | | | | 711/162 |
| 7,516,262 B2 | 4/2009 | Kawaguchi | | |
| 7,623,519 B2 | 11/2009 | Tornetta et al. | | |
| 7,685,353 B2 | 3/2010 | Kawaguchi | | |
| 7,734,847 B2 * | 6/2010 | Wagh | G06F 13/4059 | |
| | | | | 710/29 |
| 7,809,852 B2 * | 10/2010 | Mullendore | H04L 12/5693 | |
| | | | | 709/234 |
| 8,904,246 B2 * | 12/2014 | Busaba | H04L 1/1864 | |
| | | | | 714/704 |
| 8,918,542 B2 | 12/2014 | Carlson et al. | | |
| 8,924,610 B1 * | 12/2014 | Carr | H04L 67/1097 | |
| | | | | 710/10 |
| 8,990,439 B2 * | 3/2015 | Carlson | G06F 3/002 | |
| | | | | 710/5 |
| 9,130,740 B2 * | 9/2015 | Busaba | H04L 1/1864 | |
| 9,195,394 B2 * | 11/2015 | Carlson | G06F 3/002 | |
| 9,378,173 B2 * | 6/2016 | Wagh | G06F 13/4059 | |
| 9,563,511 B1 | 2/2017 | Foley et al. | | |
| 9,571,410 B2 * | 2/2017 | DeCusatis | H04L 47/39 | |
| 2002/0191649 A1 | 12/2002 | Woodring | | |
| 2003/0002503 A1 * | 1/2003 | Brewer | H04L 47/122 | |
| | | | | 370/392 |
| 2003/0021239 A1 * | 1/2003 | Mullendore | H04L 12/5693 | |
| | | | | 370/276 |
| 2003/0023790 A1 * | 1/2003 | Gerhart | G06F 3/0613 | |
| | | | | 710/58 |
| 2003/0028663 A1 * | 2/2003 | Mullendore | H04L 12/5693 | |
| | | | | 709/234 |
| 2003/0056000 A1 * | 3/2003 | Mullendore | H04L 12/5693 | |
| | | | | 709/236 |
| 2003/0074449 A1 | 4/2003 | Smith et al. | | |
| 2004/0054776 A1 * | 3/2004 | Klotz | H04L 41/06 | |
| | | | | 709/224 |
| 2004/0057389 A1 * | 3/2004 | Klotz | H04L 41/12 | |
| | | | | 370/252 |
| 2004/0059807 A1 * | 3/2004 | Klotz | H04L 41/0631 | |
| | | | | 709/223 |
| 2004/0153863 A1 * | 8/2004 | Klotz | H04L 41/12 | |
| | | | | 714/45 |
| 2005/0060574 A1 * | 3/2005 | Klotz | H04L 41/22 | |
| | | | | 726/4 |
| 2005/0060598 A1 * | 3/2005 | Klotz | G06F 11/2294 | |
| | | | | 714/4.2 |
| 2005/0076113 A1 * | 4/2005 | Klotz | H04L 12/2602 | |
| | | | | 709/224 |
| 2005/0117522 A1 * | 6/2005 | Basavaiah | G06F 3/0613 | |
| | | | | 370/252 |
| 2005/0174936 A1 | 8/2005 | Betker | | |
| 2005/0192967 A1 * | 9/2005 | Basavaiah | G06F 3/0613 | |
| 2005/0223139 A1 * | 10/2005 | Wagh | G06F 13/4059 | |
| | | | | 710/52 |
| 2005/0246504 A1 * | 11/2005 | Frey | G06F 3/0607 | |
| | | | | 711/150 |
| 2005/0262309 A1 * | 11/2005 | Frey | G06F 3/061 | |
| | | | | 711/141 |
| 2006/0059273 A1 | 3/2006 | Carnevale et al. | | |
| 2007/0002827 A1 * | 1/2007 | Lau | G06F 13/385 | |
| | | | | 370/351 |
| 2007/0011333 A1 * | 1/2007 | Lau | H04L 69/326 | |
| | | | | 709/227 |
| 2007/0011561 A1 | 1/2007 | Ambilkar et al. | | |
| 2007/0121495 A1 * | 5/2007 | Breti | G06F 13/4027 | |
| | | | | 370/229 |
| 2007/0177498 A1 | 8/2007 | Clark et al. | | |
| 2007/0208899 A1 | 9/2007 | Freking et al. | | |
| 2007/0239944 A1 * | 10/2007 | Rupanagunta | G06F 3/0613 | |
| | | | | 711/147 |
| 2007/0263649 A1 * | 11/2007 | Cuni | H04L 12/2602 | |
| | | | | 370/412 |
| 2008/0123526 A1 * | 5/2008 | Hadas | H04L 47/10 | |
| | | | | 370/231 |
| 2008/0235413 A1 * | 9/2008 | Wagh | G06F 13/4059 | |
| | | | | 710/56 |
| 2010/0146162 A1 * | 6/2010 | Wagh | G06F 13/4059 | |
| | | | | 710/52 |
| 2012/0110222 A1 * | 5/2012 | Dang | G06F 13/4282 | |
| | | | | 710/52 |
| 2012/0239833 A1 * | 9/2012 | Yoshimura | G06F 3/06 | |
| | | | | 710/52 |
| 2013/0054901 A1 | 2/2013 | Biswas et al. | | |
| 2013/0290802 A1 * | 10/2013 | Busaba | H04L 1/1864 | |
| | | | | 714/748 |
| 2013/0290803 A1 * | 10/2013 | Busaba | H04L 1/1864 | |
| | | | | 714/748 |
| 2014/0281041 A1 | 9/2014 | Carlson et al. | | |
| 2014/0344488 A1 | 11/2014 | Flynn et al. | | |
| 2014/0359168 A1 * | 12/2014 | Carlson | G06F 3/002 | |
| | | | | 710/5 |
| 2015/0120963 A1 * | 4/2015 | Carlson | G06F 3/002 | |
| | | | | 710/5 |
| 2015/0350086 A1 * | 12/2015 | Mullendore | H04L 47/10 | |
| | | | | 370/235 |
| 2015/0370683 A1 * | 12/2015 | Nishiyama | G06F 13/4282 | |
| | | | | 714/43 |
| 2016/0344629 A1 * | 11/2016 | Gray | H04L 45/60 | |

OTHER PUBLICATIONS

'Serial Attached SCSI Technical Overview' by Rob Elliott, 2002.*
'PCI Express Base Specification Revision 3.0' Nov. 10, 2010.*
'SCSI Commands Reference Manual' Product Manual, Rev. A, copyright 2006, Seagate Technology.*
'FICON Buffer-to-Buffer Credit Management: An Oxymoron?' by Enterprise Systems Media, Jul. 1, 2007.*
PCT Search Report and Written Opinion dated Aug. 17, 2016, pp. 9, for Application No. PCT/IB2016/052765 filed May 13, 2016.

(56) References Cited

OTHER PUBLICATIONS

English translation of CN103139098.
Related Art document dated Sep. 14, 2015.
Telikepalli et al., "Storage Area Network Extension Solutions and Their Performance Assessment", IEEE Communications Magazine, Apr. 2004, pp. 8.
"Fibre Channel Single-Byte Command Code Sets Mapping Protocol-5 (FC-SB-5)", Rev. 2.0, American National Standards for Information Technology, Mar. 26, 2013, pp. 269.
U.S. Appl. No. 14/717,733, filed May 20, 2015.
U.S. Appl. No. 14/717,725, filed May 20, 2015.
Notice of Allowance dated Sep. 6, 2017, pp. 20, for U.S. Appl. No. 14/717,733, filed May 20, 2015.
Office Action dated Jun. 30, 2017, pp. 33, for U.S. Appl. No. 14/717,725, filed May 20, 2015.
Office Action dated Mar. 8, 2017, pp. 35, for U.S. Appl. No. 14/717,733, filed May 20, 2015.
Response dated Jun. 8, 2017, pp. xx, to Office Action dated Mar. 8, 2017, pp. 35, for U.S. Appl. No. 14/717,733, filed May 20, 2015.
Response dated Oct. 2, 2017, pp. 11, to Office Action dated Jun. 30, 2017, pp. 33, for U.S. Appl. No. 14/717,725, filed May 20, 2015.
Notice of Allowance dated Nov. 22, 2017, p. 13, for U.S. Appl. No. 14/717,725, filed May 20, 2015.
List of IBM Patents or Patent Applications Treated as Related, dated Dec. 14, 2017, pp. 2.

\* cited by examiner

ADJUSTMENTS OF BUFFER CREDITS FOR OPTIMIZING THE NUMBER OF RETRY OPERATIONS AND TRANSFER READY OPERATIONS

BACKGROUND

1. Field

Embodiments relate to adjustments of buffer credits for optimizing the number of retry operations and transfer ready operations.

2. Background

Input/output (I/O) operations may be used to transfer data between memory and I/O devices of an I/O processing system. For example, data may be written from memory to one or more I/O devices, and data may be read from one or more I/O devices to memory by executing I/O operations. To facilitate processing of I/O operations, an I/O subsystem of the I/O processing system may be employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

In certain mechanisms, the channel subsystem and I/O device may operate in a transport mode that supports the transfer of one or more command control blocks to transfer data between the I/O devices and memory. A transport control word (TCW) may specify one or more I/O commands to be executed. For commands initiating certain I/O operations, the TCW designates memory areas associated with the operation, the action to be taken whenever a transfer to or from the area is completed, and other options.

In certain situations, the control unit may be included in a storage device. In other situations, the control unit may be included in a storage controller in which a storage management application that executes in the storage controller may manage a plurality of storage devices, such as disk drives, tape drives, flash drives, etc., that are coupled to the storage controller. The channels to communicate with the control unit may be used by a plurality of hosts that may access data stored in the storage devices.

Fibre Channel refers to an integrated set of architectural standards for data transfer being developed by the American National Standards Institute. Fibre Connection (FICON) is a protocol of the fibre channel architecture and may also be referred to by the formal name of FC-SB5. Further details of FC-SB5 may be found in the publication, "FIBRE CHANNEL Single-Byte Command Code Sets Mapping Protocol-5 (FC-SB-5)", Rev. 2.0, published by the American National Standards Institute on Mar. 26, 2013.

A channel is a direct or a switched point-to-point connection between communicating devices. In the Fibre Channel architecture, a FICON channel may perform the functions specified by FC-SB5 to provide access to Input/Output (I/O) devices by means of control units or emulated control units. FICON channels may rely on packet switching for transferring data between communicating devices.

In certain situations, data transfers sent to I/O devices may lead to data overflow at their respective control units if data is transferred at a rate that exceeds the ability of the control units to process the data.

Certain mechanisms provide a data transfer control feature that allows the control unit to specify a number and/or size of first-transfer buffers available to the channel. In certain situations, the data transfer control feature defines a first-transfer-buffer size (FTBS) value specified by the control unit, and a first-transfer-buffer credits (FTBC) value. FTBC may also be referred to as buffer credit. The FTBS and FTBC are stored in the channel and used to limit the amount of data that can be transferred to the control unit in a first data transfer message. In other situations, the control unit can specify or dynamically modify the FTBC via a response message sent to the channel in response to receiving an I/O command or commands and/or executing an I/O operation. Support for the data transfer control feature may be established during a link initialization (e.g., indicated in Process Login request and response messages) between the channel and the control unit.

High performance FICON (zHPF) Extended Distance II is an enhanced buffer management function to improve performance of FICON Transport Mode writes that are greater than a first burst size (e.g. 64 KB) at long distances and to prevent low buffer conditions in the storage controller ports from causing storage area network (SAN) congestion. It is an improvement over zHPF Extended Distance that provided support for disabled first transfer ready.

U.S. patent publication 2014/0359,168 describes mechanisms for performing I/O operation at a host computer system configured for communication with a control unit. A transport mode command message is sent from a channel subsystem to the control unit, the command message including a command for data to be transferred to an I/O device controlled by the control unit. A data transfer message is sent to the control unit, the data transfer message having an amount of the data to be transferred, the amount of the data being less than or equal to a maximum amount of data, the maximum amount of data corresponding to a number of buffers associated with the control unit and a size of each of the number of buffers, the number and the size indicated by a value maintained in the host computer system. In certain mechanism, the channel includes in the local channel memory information regarding the size of available buffers associated with the control unit to which the channel is connected. The channel may also include information regarding the available buffer credits for the control unit. For example, prior to initiating the I/O operation, e.g., during a login or initialization process, the control unit sends buffer size and/or buffer credit information to the channel.

U.S. Pat. No. 8,918,542 describes mechanisms for performing an input/output (I/O) operation initiated by an I/O operation instruction at a host computer system configured for communication with a control unit. The control unit receives a transport mode command message from a channel subsystem of the host computer system, where the command message includes a command for data to be transferred between the host computer system and an I/O device controlled by the control unit. A command retry message is sent to the channel subsystem, the command retry message including a request that the command message be resent to the control unit and a reason code indicating a reason for the request.

Therefore, U.S. Pat. No. 8,918,542 and U.S. publication 2014/0359,168 provide details of command retries and transfer buffer credits as may be implemented in certain versions of FICON.

SUMMARY OF THE PREFERRED EMBODIMENTS

Provided are a method, a system, and a computer program in which a control unit monitors a number of transfer ready operations and a number of retry operations during a monitoring period during communication with a plurality of channels. Based on the monitoring, a number of buffer credits for communication with the plurality of channels is adjusted. As a result, buffer space may be conserved in the control unit by adjusting buffer credits when the buffer credits are too much and buffer space may be utilized more effectively by adjusting buffer credits when the buffer credits are too few. The number of buffer credits are adjusted such that the number of available buffers are not exhausted and a high rate of data transfer is maintained.

In certain embodiments, the adjusting of the number of buffer credits is performed to place the number of transfer ready operations and the retry operations relative to a number of write operations within a predetermined operating range. As a result, the system avoids performing too many retries or transfer readies.

In further embodiments, an adjusted number of transfer ready operations is determined for adjusting the number of buffer credits, by subtracting a number of operations that are requested to be retried from a total number of transfer ready operations. As a result, the transfer ready operations caused as a result of retries are accounted for in the adjusted number of transfer ready operations.

In certain embodiments, in response to determining that there is use of transfer ready operations but no use of retry operations during the monitoring period, and in response to determining that the number of transfer ready operations is greater than a transfer ready threshold, the number of buffer credits is increased. As a result, the frequency of transfer ready operations that take relatively more time for data transfer may be reduced. Additionally, in response to determining that the number of transfer ready operations is not greater than the transfer ready threshold, the control unit continues to monitor the number of transfer ready operations and the number of retry operations during an additional monitoring period during communication with the plurality of channels.

In additional embodiments, in response to determining that there is use of retry operations but no use of transfer ready operations during the monitoring period, and in response to determining that the number of retry operations is greater than a retry low threshold, the number of buffer credits is decreased. As a result, the buffer space is conserved in the control unit. Additionally, in response to determining that the number of retry operations is not greater than the retry low threshold, the control unit continues to monitor the number of transfer ready operations and the number of retry operations during an additional monitoring period during communication with the plurality of channels.

In certain embodiments, in response to determining that there is use of both transfer ready operations and retry operations during the monitoring period, and in response to determining that the number of retry operations is greater than a retry high threshold, the number of buffer credits is decreased. As a result, an optimal number of buffer credits are maintained that neither exhausts the number of available buffers nor slows down the rate of data transfer.

In certain additional embodiments, in response to determining that the number of retry operations is not greater than a retry high threshold, the control unit continues to monitor the number of transfer ready operations and the number of retry operations during an additional monitoring period during communication with the plurality of channels.

In certain embodiments, in response to determining that there is use of transfer ready operations but no use of retry operations during the monitoring period, and in response to determining that the number of transfer ready operations is greater than a transfer ready threshold, the number of buffer credits is increased. Additionally, in response to determining that there is use of retry operations but no use of transfer ready operations during the monitoring period, and in response to determining that the number of retry operations is greater than a retry low threshold, the number of buffer credits is decreased. Furthermore, in response to determining that there is use of both transfer ready operations and retry operations during the monitoring period, and in response to determining that the number of retry operations is greater than a retry high threshold, the number of buffer credits is decreased.

Provided also is a storage controller in communication with one or more hosts, the storage controller comprising a memory, and a processor coupled to the memory, where the processor performs operations, the operations comprising: monitoring, by a control unit of the storage controller, a number of transfer ready operations and a number of retry operations during a monitoring period during communication with a plurality of channels of the one or more hosts; and based, on the monitoring, adjusting a number of buffer credits for communication with the plurality of channels of the one or more hosts. As a result, the number of buffer credits are adjusted such that the number of available buffers are not exhausted and a high rate of data transfer is maintained.

BRIEF DESCRIPTION OF THE DRAWINGS

Referring now to the drawings in which like reference numbers represent corresponding parts throughout.

DETAILED DESCRIPTION

Figure 1:
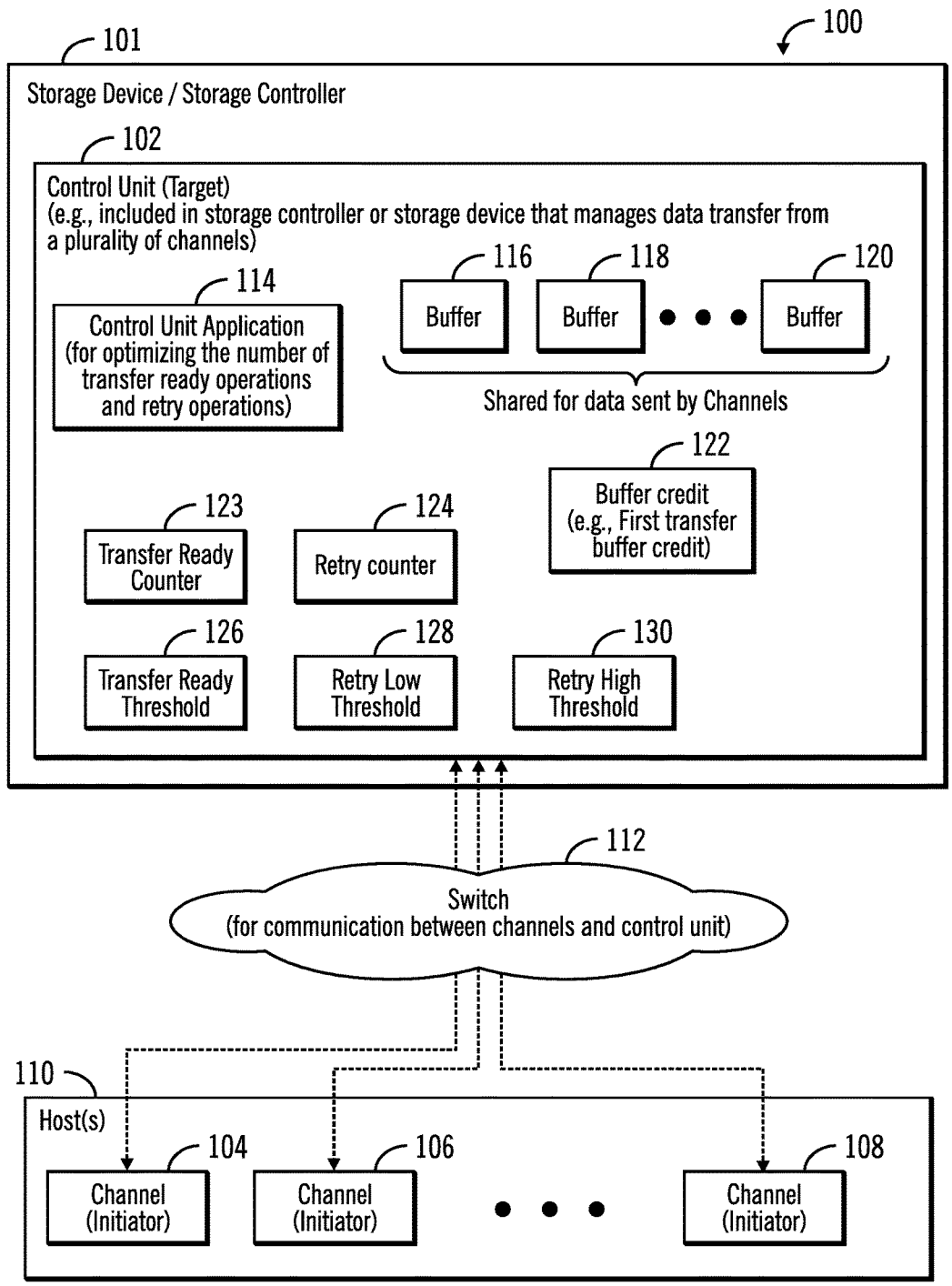
FIG. 1 illustrates a block diagram of a computing environment comprising a target that may be a control unit and a plurality of initiators that may be a plurality of channels, in accordance with certain embodiments.

In the following description, reference is made to the accompanying drawings which form a part hereof and which illustrate several embodiments. It is understood that other embodiments may be utilized and structural and operational changes may be made.

Certain embodiments are provided in which a control unit (also referred to as a target) adjusts the number of buffer credits based on the number of transfer readies and retries during a period of time, in order to improve the performance of the data transfer from a plurality of channels to a control unit. The number of buffer credits are adjusted such that the number of available buffers are not exhausted and a high rate of data transfer is maintained.

In certain situations, according to FCP (Fibre Channel Protocol) or FICON standards, the use of transfer ready for data transfer is fixed to one first burst buffer when transfer ready is disabled. When storage ports run out of receive buffers, they may starve the storage area network (SAN) of buffer credits and cause fabric congestion.

Certain embodiments provides mechanisms to manage receive buffers in the host adapter through the use of First Transfer Buffer Credits and Transport mode Command Retry features. It provides for relief of fabric congestion caused by slow draining ports and makes use of the capability to retry operations using transfer ready when receive buffers are in short supply.

Certain embodiments provide mechanisms for managing first transfer buffers in a storage device. In certain embodiments, transport command retry requests are sent to the channel when the control unit (target) is out of or low in buffers and the retry request asks the channel to conduct a transport command retry (via a transfer ready handshake) which transfers data to the control unit with certainty. In certain embodiments, the control unit provide indication of the likely credits that will be available so that no advance handshake is required. Provided also are mechanisms to adjust the buffer credits for a channel, based on how many retries are occurring or how many transfer ready handshakes are occurring.

In certain embodiments, to prevent congestion caused by lack of buffers and to provide a mechanism for retry with transfer ready with minimized retransmission, a control system is provided to make use of the improvements in FICON architecture as described in U.S. Pat. No. 8,918,542 and U.S. publication 2014/0359,168, such that the embodiments provide for retry when out of data buffers and provide buffer credits to the channel, and during the process tries to optimize the number of buffer credits.

Certain embodiments allow for large transfers with a minimal number of turnarounds. Ideally every command may be executed with one or two turnarounds subject to concurrent workload and buffer availability. Certain embodiments greatly reduce the number of retransmissions required when the write workload exceeds the maximum concurrency and also makes efficient use of available data buffer resources.

Certain embodiments introduce a link architecture to allow a dynamic use of first transfer ready disabled/required and a dynamic length of first burst data. The FICON channel may determine on an operation (start) basis whether to disable or require transfer ready for first burst data and, and when disabling transfer ready, sending an arbitrary amount of data based on credit hints from the control unit. In addition, the control unit port provides the capability to receive a large (e.g., greater than 64K) first burst data Information Unit (IU) sequence into multiple "first burst" receive data buffers.

Exemplary Embodiments

FIG. 1 illustrates a block diagram of a computing environment 100 comprising a target 102 that may be a control unit and a plurality of initiators 104, 106, . . . , 108 that may be a plurality of channels, in accordance with certain embodiments. The control unit 102 may be included in a storage controller or a storage device 101 that manages data transfer from the plurality of channels 104, 106, . . . , 108. The plurality of channels 104, 106, . . . , 108 may be included in one or more hosts 110.

The storage controller 101 that includes the control unit 102 and controls storage devices, and the hosts 110 may comprise any suitable computational device including those presently known in the art, such as, a personal computer, a workstation, a server, a mainframe, a hand held computer, a palm top computer, a telephony device, a network appliance, a blade computer, a processing device, etc. The storage controller 101 and the hosts 110 may be elements in any suitable network, such as, a storage area network, a wide area network, the Internet, an intranet. In certain embodiments, storage controller 101 and the hosts 110 may be elements in a cloud computing environment.

The plurality of channels 104, 106, . . . , 108 and the control unit 102 communicate via a switch 112 as shown in FIG. 1 over the Fibre Channel Protocol (FCP), FICON or any other suitable protocol.

The control unit 102 includes a control unit application 114 for optimizing the number of transfer ready and retry operations for improving the performance of the data transfer between the control unit 102 and the channels 104, 106, . . . , 108. The control unit application 114 may be implemented in software, hardware, firmware or any combination thereof.

The control unit 102 controls a plurality of buffers 116, 118, . . . , 120 that are shared for storing the data received from the channels 104, 106, . . . , 108 by the control unit 102. In certain embodiments, the buffers 116, 118, . . . , 120 are referred to as receive buffers. In certain embodiments, each buffer may be 64 kilobytes in size and there may be 2000 buffers.

The control unit application 114 uses data structures corresponding to a buffer credit 122, a transfer ready counter 123, a retry counter 124, a transfer ready threshold 126, a retry low threshold 128, and a retry high threshold 130 to optimize the number of transfer ready operations and retry operations for transferring data from the channels 104, 106, . . . , 108 to the buffers 116, 118, . . . , 120 of the control unit 102. The transfer ready counter 123 stores the number of transfer ready operations and the retry counter 124 stores the number of retry operation. In certain embodiments, since a number of operations may use transfer ready as a result of a request to retry an overrun operation, in certain embodiments the number of operations that use transfer ready due to not enough buffer credits is approximated by subtracting the number of retry operations from the total number of transfer ready operations, and the transfer ready counter 123 may in such embodiments correspond to this approximated value.

Therefore, FIG. 1 shows certain embodiments in which a control unit application 114 optimizes the number of transfer ready operations and retry operations by adjusting buffer credits 122 allocated for the channels 104 . . . 108 in accordance with FCP and FICON and other communication or transport protocols.

Figure 2:
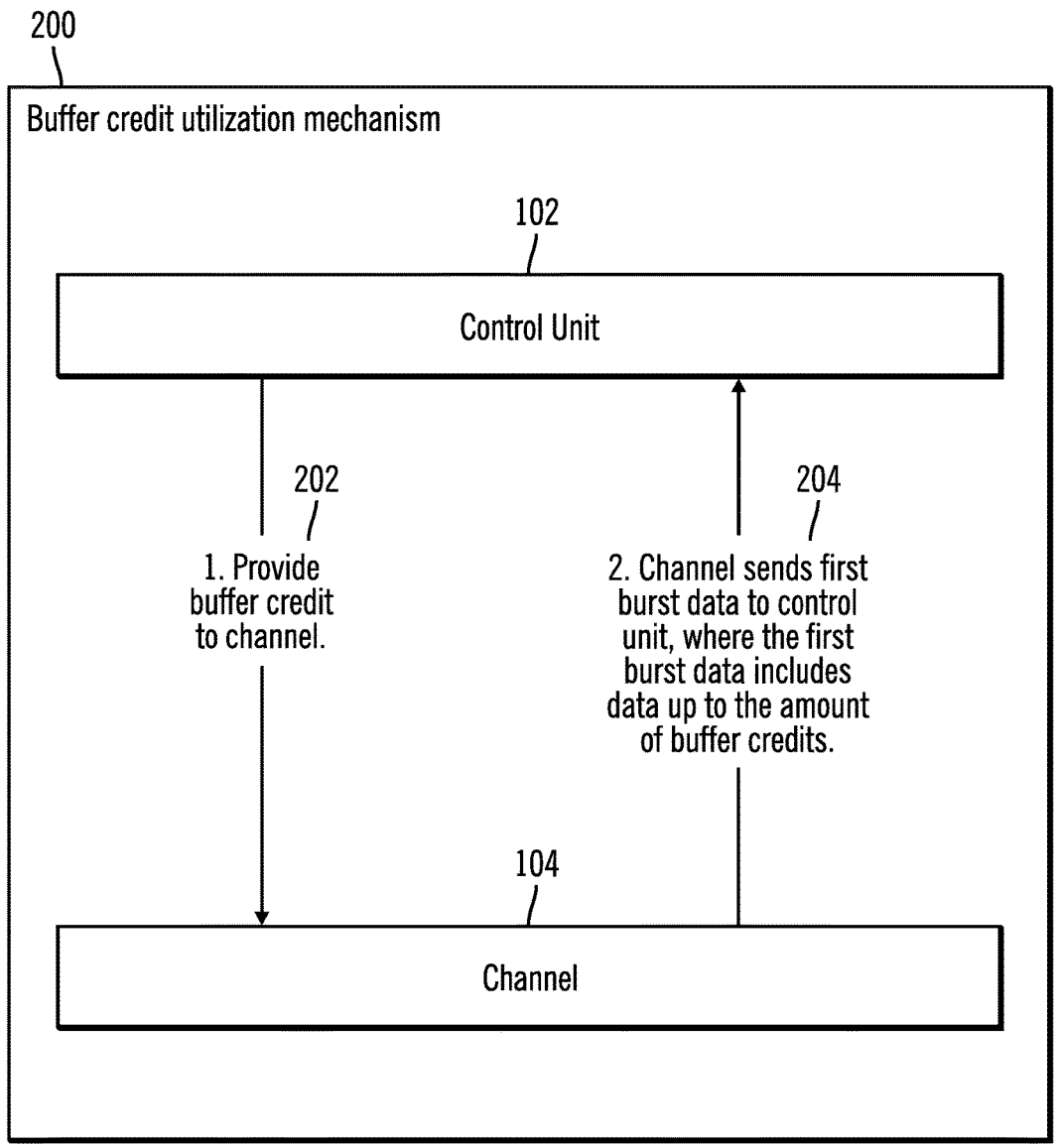
FIG. 2 illustrates a block diagram for buffer credit utilization, in accordance with certain embodiments.

FIG. 2 illustrates a block diagram 200 for buffer credit utilization, in accordance with certain embodiments.

During initialization, the control unit 102 may provide a buffer credit to the channel 104 (as shown via reference numeral 202). In certain embodiments, the buffer credit may correspond to a first-transfer-buffer credits (FTBC) value in the FICON standards.

When buffer credits are provided to the channel 104, during the sending of data the channel 104 sends the first burst data to the control unit 102 in a manner such that the first burst data includes data up to the amount of buffer credits (as shown via reference numeral 204). For example, if the buffer credits allow the channel to send data that may be stored in up to eight buffers of the plurality of buffers 116, 118, . . . , 120 (e.g., buffer credit is 8), then during the first burst of data from the channel 104 to the control unit 102 at least data that may be stored in up to 8 buffers may be sent. Since the channel 104 is aware of the number of buffer credits, it knows the amount of data it can transfer to the control unit 102 in a first burst in addition to any data that may otherwise be sent in the first burst without any buffer credits.

Figure 3:
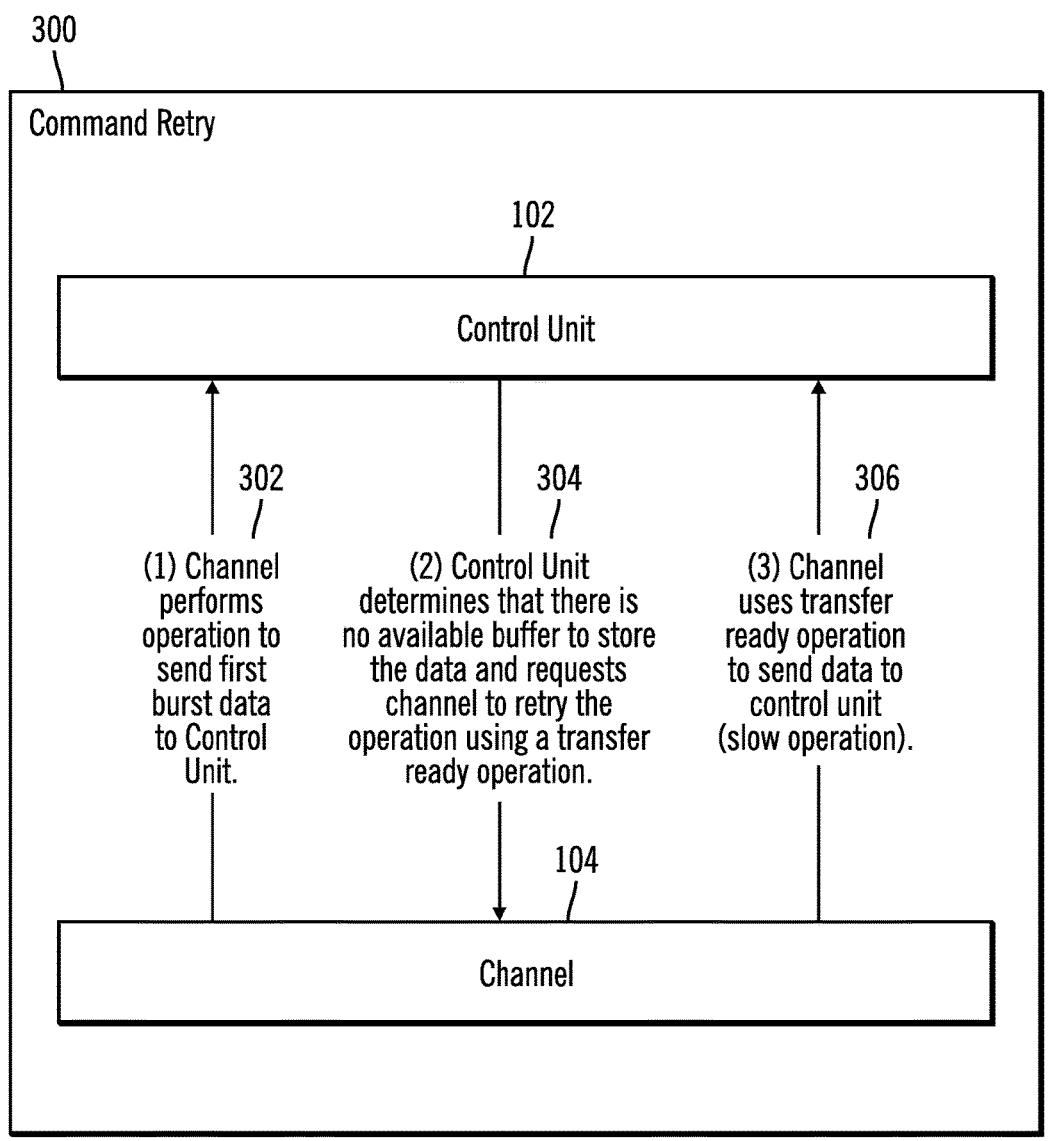
FIG. 3 illustrates a block diagram that shows command retries, in accordance with certain embodiments.

FIG. 3 illustrates a block diagram 300 that shows command retries, in accordance with certain embodiments. The channel 104 performs operations to send first burst data to the control unit 102 (reference numeral 302) when a buffer credit has been provided to the channel 104.

Since a plurality of channels 104, 106, . . . , 108 may be transferring data to the control unit 102 it is possible that the control unit 102 may find that there is no empty space in the plurality of buffers 116, 118, . . . , 120 to store the data transferred by the channel 104. If the control unit 102 determines that there is no available buffer to store the data sent by the channel 104, then the control unit 102 requests the channel 104 to retry the operation using a transfer ready operation (reference numeral 304).

The control unit 102 does not have to wait for buffers to be available. When the retry occurs using transfer ready (slow operation), the retried command is received by the control unit 102 and then when there are buffers available to receive the data, the control unit 102 sends the transfer ready to the channel to request the data.

In certain alternative embodiments the control unit 102 waits for buffers to be available and then requests the retry without using transfer ready (using first burst data), but there is no guarantee that the buffers will still be available when the data finally arrives and the system may lose the guarantee that the operation will be successful on the first retry (unless data buffers are reserved for the specific operation). The control unit 102 has the capability to indicate to the channels 104, 106 . . . , 108 whether or not to retry using transfer ready based on the reason code that it uses for the retry.

The transfer ready operation is a relatively slower mechanism to transfer data from the channel 104 to the control unit 102, because at least one additional round trip is required for the transfer ready operation. The speed of light dictates that I/O operations are delayed by 5 microseconds per kilometer for each one way trip. Read operations on high performance FICON normally require a single round trip or 10 microseconds per kilometer Write operations typically require a single round trip when transfer ready is disabled, and at least two round trips when transfer ready is required. Each additional transfer ready may require an additional round trip. For writes as well as reads, confirm adds an additional one way trip at 5 microseconds per kilometer. Streamlined operations are particularly important as customers use High Availability (HA) configurations with two processing centers often at 10-20 kilometer distances apart. In the case of a processor failure, or in active-active configuration, I/O is received from the remote host processor. Distances of up to 100 kilometers are often supported. Longer distances are possible with the use of channel extension technologies. Since the transfer ready operations require at least two round trips it may be considerably slower than mechanisms that uses transfer ready disabled.

In response to the channel being informed that a retry is to be performed using a transfer ready operation, the channel 104 uses transfer ready operation to send data to the control unit 102 (reference numeral 306).

Therefore, when available space in the plurality of buffers 116, 118, . . . , 120 are unable to accommodate data sent by the channels 104, 106, . . . , 108 in transfer ready disabled mode with indicated buffer credits, then the control unit 102 may indicate to the channel whose data was not accommodated that the operation should be retried via the relatively slow transfer ready operation.

Figure 4:
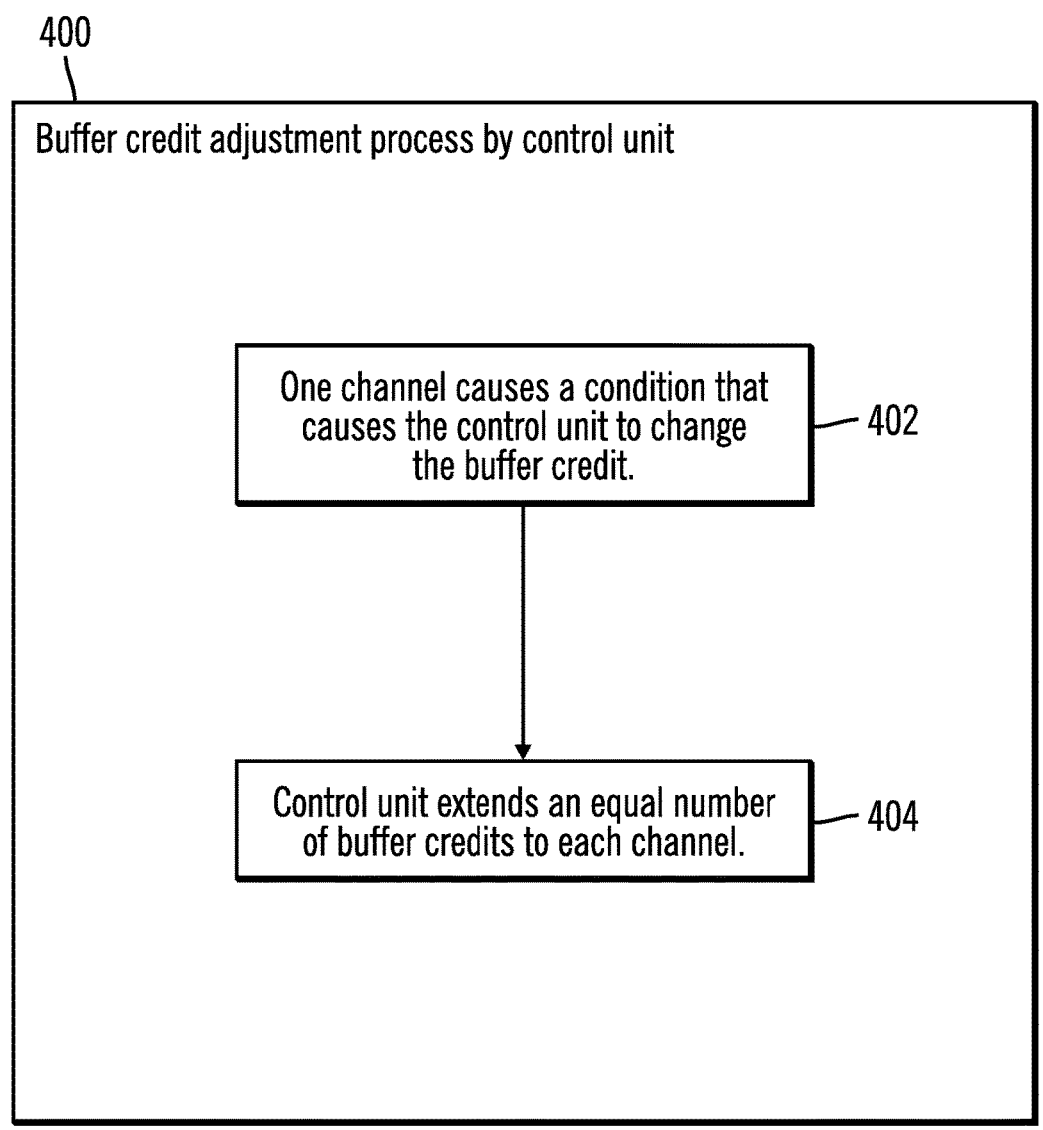
FIG. 4 illustrates a block diagram that shows operations of a buffer credit adjustment process, in accordance with certain embodiments.

FIG. 4 illustrates a block diagram 400 that shows operations of a buffer credit adjustment process, in accordance with certain embodiments. In FIG. 4, at block 402, one of the channels (e.g. channel 104) causes a condition that causes the control unit 102 to change the buffer credit 122 that is granted. For example, if too much buffer credit is granted then buffers 116, 118, . . . , 120 get full too quickly and retries that fall back on relatively slow transfer ready have to be used. In such a situation, it may be desirable to reduce the number of buffer credits 122.

When a decision is made by the control unit 102 to reduce (e.g., when there are too many retries) or increase (e.g., when there are many operations using transfer readies) the number of buffer credits then the control unit 102 extends an equal number of buffer credit to each channel of the plurality of channels 104, 106, . . . , 108 (as shown in block 404). By treating the channels equally, the control unit 102 prevents any single channel from acquiring an overwhelming amount of space in the buffers 116, 118, . . . , 120 at the expense of the other channels. In alternative embodiments, it may be possible to provide different number of credits to different channels based on their historical data transfer needs or other requirements.

Figure 5:
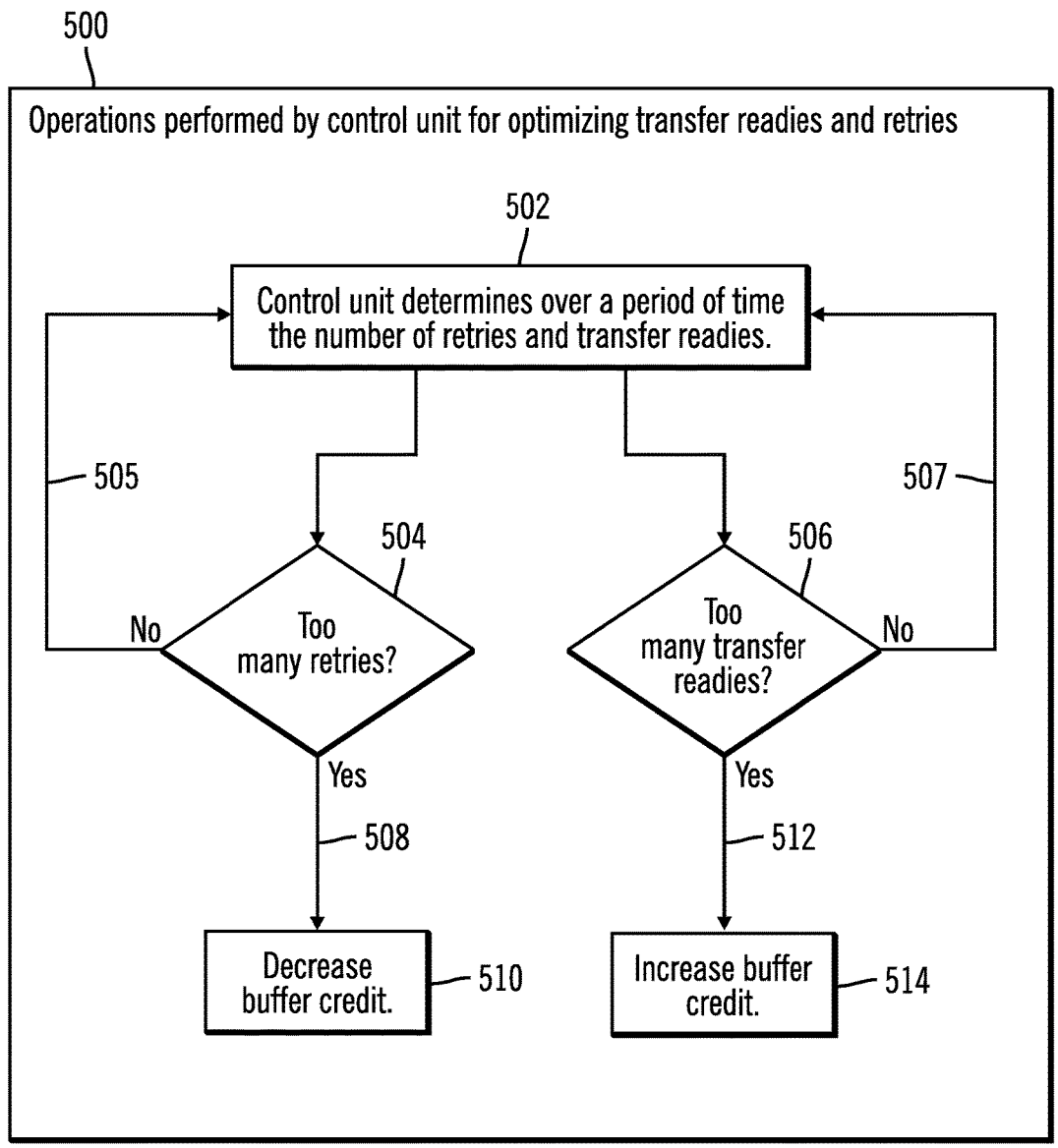
FIG. 5 illustrates a first flowchart that shows that shows control unit operations for optimizing transfer readies and retries, in accordance with certain embodiments.

FIG. 5 illustrates a flowchart 500 that shows that shows control unit operations for optimizing transfer readies and retries, in accordance with certain embodiments. The operations shown in FIG. 5 may be implemented in the control unit 102 and may be performed by the control unit application 114.

Control starts at block 502 in which the control unit 102 determines over a period of time the number of retries and transfer readies (i.e., transfer ready operations) that have occurred with respect to communications from the plurality of channels 104, 106, . . . , 108. From block 502 control proceeds in parallel to blocks 504, 506.

At block 504, the control unit 102 determines whether too many retries (i.e., retry operations) have occurred. If too many retries have occurred ("Yes" branch 508) then too much buffer credit has been allocated to each channel, and the control unit 102 decreases the number of buffer credits for each channel at block 510. If too many retries have not occurred ("No" branch 505), then control returns to block 502.

At block 506, the control unit 102 determines whether too many transfer readies have occurred. If too many transfer readies have occurred ("Yes" branch 512), then it is possible that that system performance may improve if the buffer credits are increased, and the control unit increases the number of buffer credits (at block 514). If too many transfer readies have not occurred ("No" branch 507) then control returns to block 502.

Therefore, FIG. 5 illustrates an embodiment in which the number of buffer credits are adjusted based on the number of retries and/or transfer readies.

Figure 6:
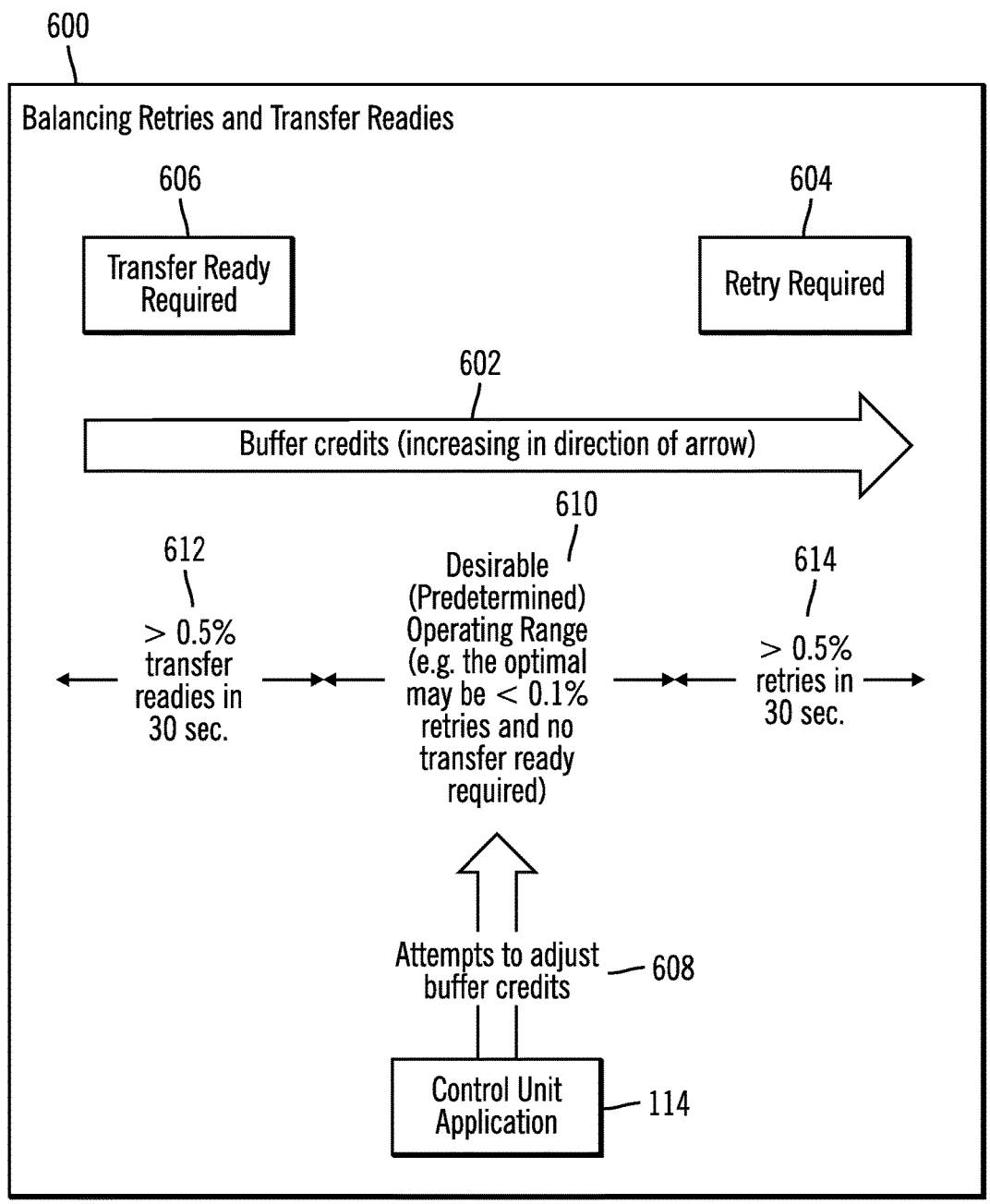
FIG. 6 illustrates a block diagram that shows how retries and transfer readies are balanced, in accordance with certain embodiments.

FIG. 6 illustrates a block diagram 600 that shows how retries and transfer readies are balanced, in accordance with certain embodiments. Reference numeral 602 shows the number of buffer credits increasing in the direction of the arrow towards the right of the page. If the number of buffer credits is large then the buffers 116, 118, . . . , 120 may not be able to accommodate all the data from the channels and retries may be required (shown via reference numeral 604). If the number of buffer credits is small then the slow process of transfer readies may be required to transfer data (shown via reference numeral 606). The control unit application 114 attempts to adjust the number of buffer credits (reference numeral 608) such that the system is in a desirable operating range, where the desirable operating range may be a predetermined operating range. For example, the desirable operating range that is predetermined may be that there are no more than 0.5% operations that are retries within the last 30 seconds and there are no more than 0.5% operations that are transfer readies within the last 30 seconds (as shown via reference numeral 610). The optimal operating condition may be less than 0.1% operations being retries and no transfer ready being required in the last 30 seconds. Reference numerals 612 and 614 show undesirable operating ranges where there are too many transfer readies (e.g., more than 0.5% of the operations in last 30 seconds) or too many retries (e.g., more than 0.5% of the operations in last 30 seconds).

Figure 7:
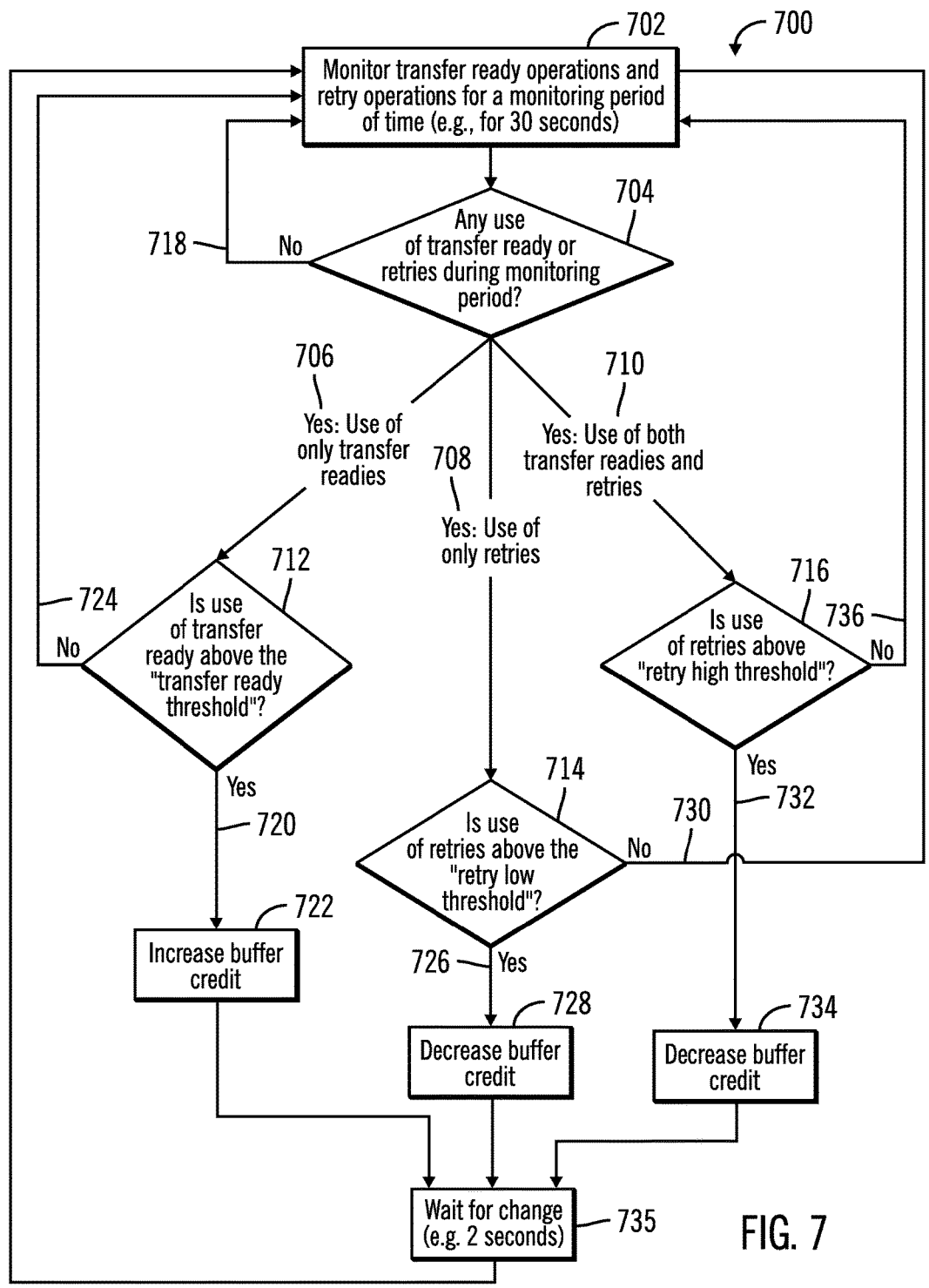
FIG. 7 illustrates a second flowchart that shows how buffer credits are adjusted for optimizing the number of retries and transfer readies, in accordance with certain embodiments.

FIG. 7 illustrates a flowchart 700 that shows how buffer credits are adjusted for optimizing the number of retries and transfer readies, in accordance with certain embodiments. The operations shown in FIG. 7 may be implemented in the control unit 102 and may be performed by the control unit application 114.

Control starts at block 702 in which the control unit 102 monitors transfer ready operations and retry operations for a monitoring period of time. In certain embodiments, the monitoring period may be 30 seconds.

Control proceeds to block 704 in which the control unit 102 determines whether there is any use of transfer ready or retries during the monitoring period. If there is use of only transfer readies (i.e., there are no retries) [branch 706] then control proceeds to block 712. If there is use of only retries (i.e., there is no use of transfer readies) [branch 708] then control proceeds to block 714. If there is use of both transfer readies and retries [branch 710] then control proceeds to block 716. If there is no use of transfer readies or retries during the monitoring period (at block 704) then control proceeds to block 702 via "No" branch 718.

At block 712 a determination is made as to whether the use of transfer ready is above the transfer ready threshold 126. The transfer ready threshold is a low threshold (e.g., 0.2% of operations) and is predetermined. If so ("Yes" branch 720) control proceeds to block 722 where the buffer credit is increased. If not ("No" branch 724) control returns to block 702.

At block 714 a determination is made if the use of retries is above the "retry low threshold" 128. For example, the retry low threshold may be 0.1% of operations. If the use of retries is above the "retry low threshold" ("Yes" branch 726) then the buffer credit is decreased (at block 728). If the use of retries is not above the "retry low threshold" 726 ("No" branch 730) then control returns to block 702.

Control reaches block 716, when there is use of both transfer readies and retries. When both transfer readies and retries are used there are 4 cases to consider. The four cases are the following:

Case 1: If the number of transfer readies are below the transfer ready threshold and the number of retries are below the retry high threshold, then the control unit 102 continues to monitor the transfer readies and retries.

Case 2: If the number of transfer readies are below the transfer ready threshold and the number of retries are above the retry high threshold then the control unit 102 decreases the number of buffer credits.

Case 3: If the number of transfer readies are above the transfer ready threshold and the number of retries are below the retry high threshold then in certain embodiments the control unit 102 may choose to increase the buffer credit and in other embodiments the control unit 102 may choose to continue to monitor the transfer readies and retries. In embodiments in which the control unit 102 chooses to increase the buffer credit, the system may reach a situation shown in Case 4 below in which the buffer credit may have to be decreased. In order to avoid thrashing back and forth by repeatedly increasing and decreasing the buffer credits, in certain embodiments for simplicity it may be adequate to continue to monitor the transfer readies and retries instead of increasing the buffer credit. In those embodiments in which the buffer credit is increased, the control unit 102 may track that the increase of the buffer credit has already been done once and in the event of thrashing (i.e., buffer credit is decreased after buffer credit increase) the buffer credit is not increased once again.

Case 4: If the number of transfer readies are above the transfer ready threshold and the number of retries are above the retry high threshold (e.g. 0.5% of operations being retries may be the retry high threshold), then the control unit 102 decreases the buffer credit.

In view of cases 1-4 shown above, in certain embodiments whenever the retry count is above the retry high threshold, the control unit 102 decreases the buffer credit regardless of the number of transfer readies, and continues to monitor transfer readies and retries otherwise. Such embodiments are shown in FIG. 7, in which at block 716 a determination is made as to whether the use of retries is above a "retry high threshold" 130. If so, ("Yes" branch 732) control proceeds to block 734 where the buffer credit is decreased. If not ("No" branch 736) control proceeds to block 702.

From block 722, 728, 734 in which an adjustment is made to the buffer credit the control unit 102 waits for a certain period of time for the system to change (e.g., for 2 seconds as shown via reference numeral 735) prior to monitoring the transfer ready operations and retry operations for a monitoring period of time once again (at block 702).

Therefore, FIG. 7 illustrates certain embodiments in which based on the amount of usage of transfer readies and retries during a monitoring period, adjustments are made to the buffer credit to improve the performance of data transfer.

Figure 8:
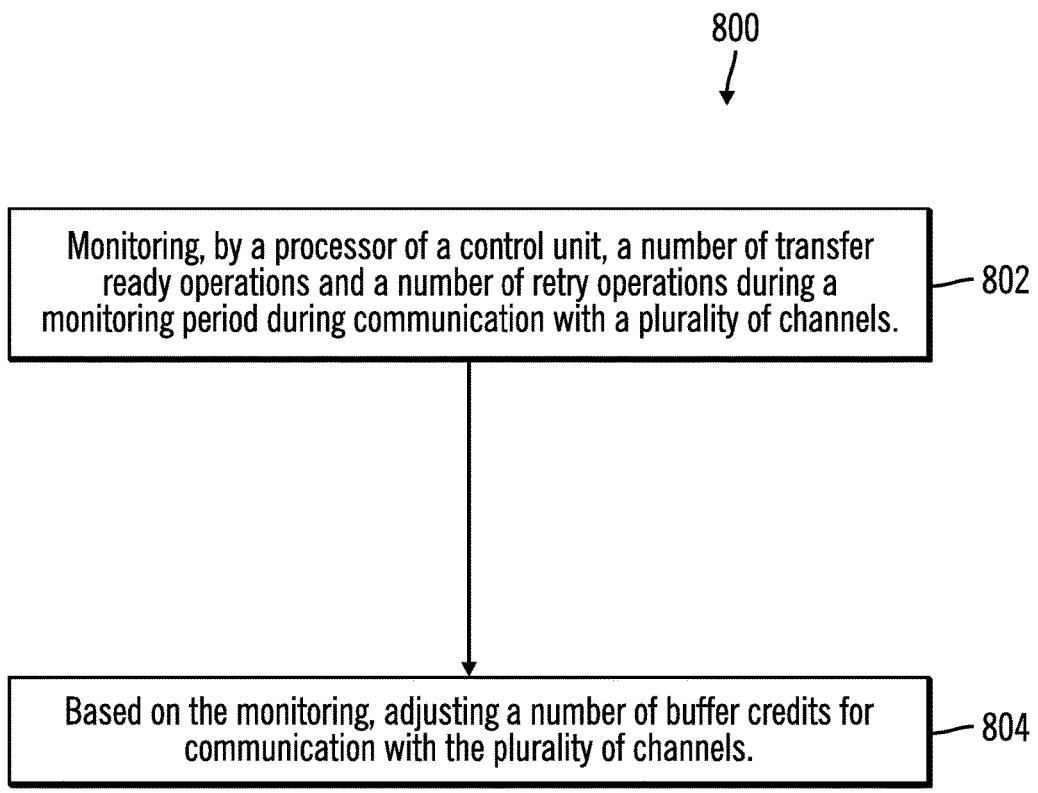
FIG. 8 illustrates a third flowchart that shows how buffer credits are adjusted for optimizing the number of retries and transfer readies, in accordance with certain embodiments.

FIG. 8 illustrates a flowchart 800 that shows how buffer credits are adjusted for optimizing the number of retries and transfer readies, in accordance with certain embodiments. The operations shown in FIG. 8 may be implemented in the control unit 102 and may be performed by the control unit application 114.

Control starts at block 802 in which a control unit 102 monitors a number of transfer ready operations and a number of retry operations during a monitoring period during communication with a plurality of channels 104, 106, . . . , 108. Based, on the monitoring, a number of buffer credits 122 for communication with the plurality of channels 104, 106, . . . , 108 is adjusted (at block 804).

Figure 9:
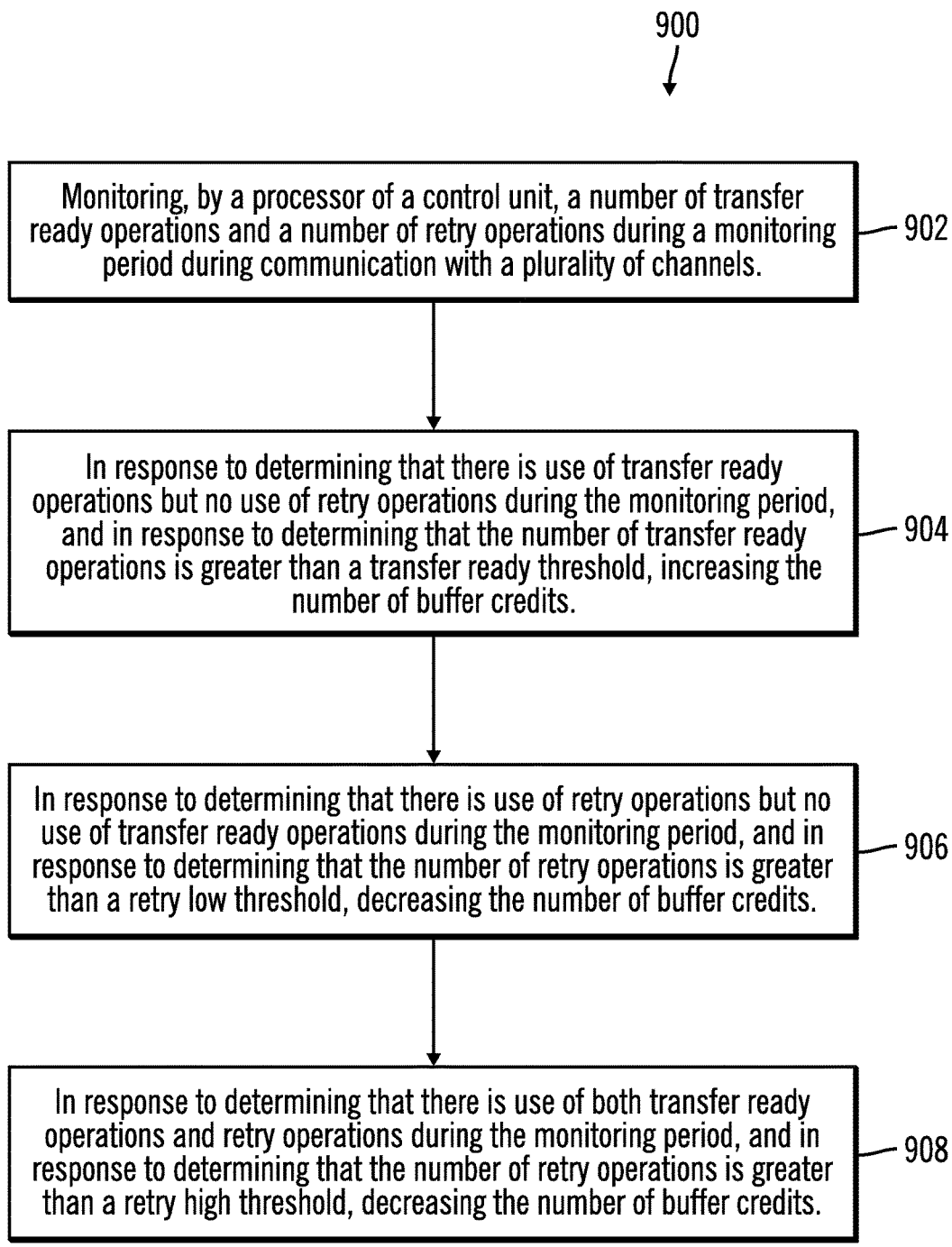
FIG. 9 illustrates a fourth flowchart that shows how buffer credits are adjusted for optimizing the number of retries and transfer readies, in accordance with certain embodiments.

FIG. 9 illustrates a flowchart 900 that shows how buffer credits are adjusted for optimizing the number of retries and transfer readies, in accordance with certain embodiments. The operations shown in FIG. 9 may be implemented in the control unit 102 and may be performed by the control unit application 114.

Control starts at block 902 in which a control unit 102 monitors a number of transfer ready operations and a number of retry operations during a monitoring period during communication with a plurality of channels 104, 106, . . . , 108.

Control proceeds from block 902 to block 904, in which in response to determining that there is use of transfer ready operations but no use of retry operations during the monitoring period, and in response to determining that the number of transfer ready operations is greater than a transfer ready threshold, the number of buffer credits is increased.

From block 904, control proceeds to block 906, in which in response to determining that there is use of retry operations but no use of transfer ready operations during the monitoring period, and in response to determining that the number of retry operations is greater than a retry low threshold, the number of buffer credits is decreased.

Control proceeds from block 906 to block 908, in which in response to determining that there is use of both transfer ready operations and retry operations during the monitoring period, and in response to determining that the number of retry operations is greater than a retry high threshold, the number of buffer credits is decreased.

Therefore, FIGS. 1-9 illustrate certain embodiments in which a control unit 102 (also referred to as a target) adjusts the number of buffer credits based on the number of transfer readies and retries during a period of time, in order to improve the performance of the data transfer from a plurality of channels 104, 106, . . . , 108 to the control unit. The number of buffer credits are adjusted such that the number of available buffers are not exhausted and a high rate of data transfer is maintained.

Adjustment of Buffer Credits and Other Parameters in Startup Phase

In certain embodiments, in the beginning, the channels 104, 106, . . . , 108 may be provided with much fewer buffer credits (e.g., 16) than the number of buffers (e.g., 2000) available in the control unit 102. The channels 104 . . . 108 may use the buffer credits for the first I/Os and then start requiring transfer ready operations for the remaining I/Os. No retry operations should be needed. It should be noted that retry operations are considerably more time consuming than transfer ready operations. It is desirable to get to a point where no transfer ready operations are required, if possible, without causing any retry operations, and to get to that point in time relatively quickly.

Since there is opportunity lost when transfer ready operations are being used without having seen any retry operations, and data rate is automatically slowed when retry operations begin to use transfer ready, it is better to err on the side of having operations using transfer ready because of retry, and then back off to a position where retries do not occur. Therefore, in certain embodiments buffer credit is increased at a faster pace than it is decreased. In other words, increments to buffer credit are made quickly until it causes a situation where retries occur or no more transfer ready is used, and the buffer credits are decremented at a slower pace than the pace of increments made during a startup phase.

In certain embodiments is may be desirable to set the system to reach the point of retries (or no more transfer ready) within 5 minutes of a workload startup. From the point of retries being required, a point of stability may be reached within an additional 3-5 minutes.

Figure 10:
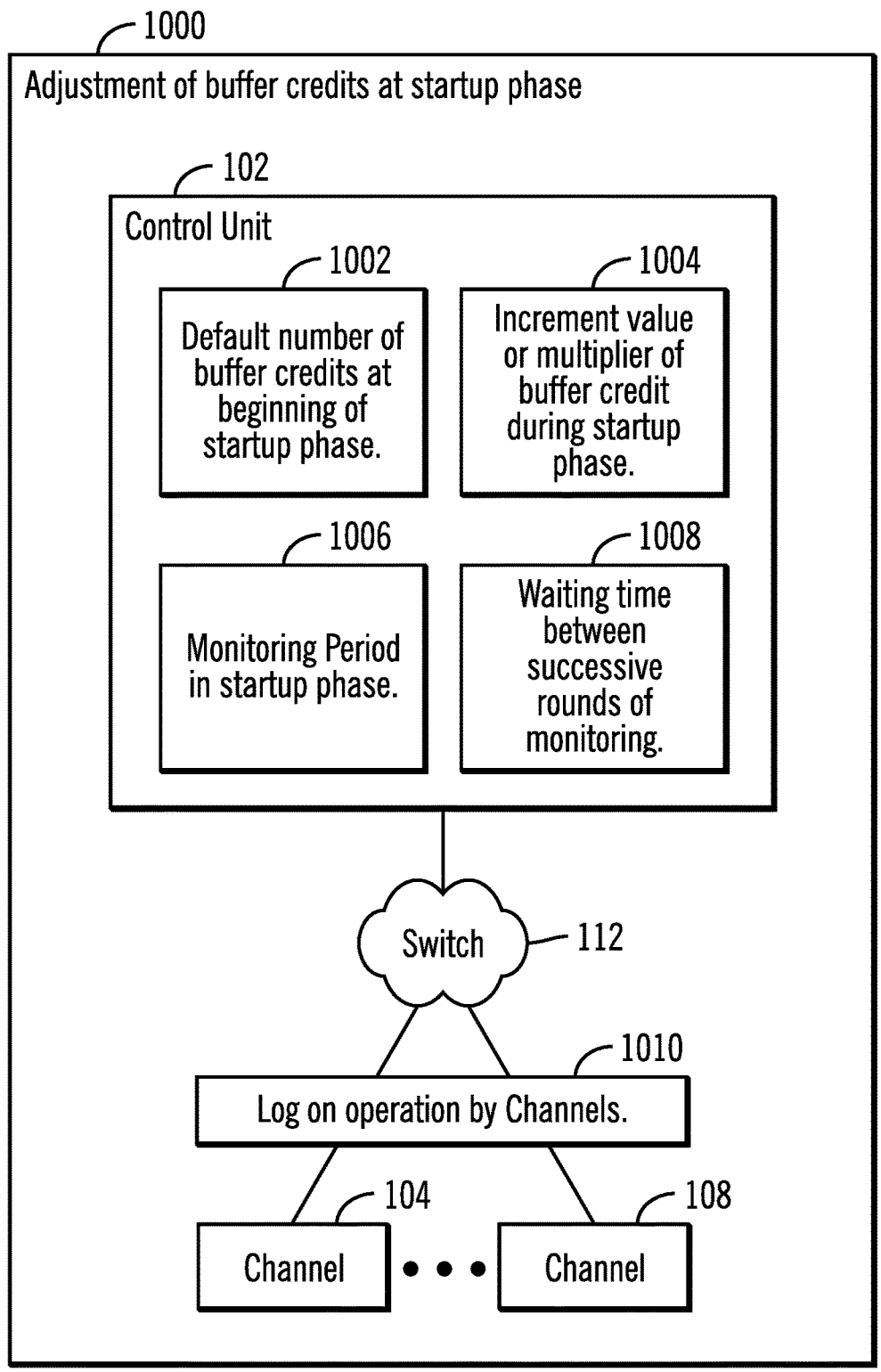
FIG. 10 illustrates a block diagram showing the adjustment of buffer credits in a startup phase, in accordance with certain embodiments.

FIG. 10 illustrates a block diagram 1000 showing the adjustment of buffer credits in a startup phase, in accordance with certain embodiments.

The control unit 102 may in addition to the elements shown in FIG. 1 and other figures include indications for the default number of buffer credits at the beginning of a startup phase (reference numeral 1002), the increment or multiplier value of buffer credit during startup phase (reference numeral 1004), the monitoring period in the startup phase (reference numeral 1006), and the waiting time between successive rounds of monitoring (reference numeral 1008).

The default number of buffer credits provided by the control unit 102 to each of the channels 104 to 108 may be 16 which is considerably less than the number of available buffers 116 . . . 120 in the control unit 102 which may be 2000. The default value of 16 may be provided when the channels 104 . . . 108 perform a log on operation (shown via reference numeral 1010) to connect to the control unit 102 via the switch 112. The log on operation may be regarded as the beginning of the startup phase.

The increment value of buffer credit 1004 during the startup phase may be set to 16. In such embodiments, during the startup phase the buffer credits are increased by an increment of 16 after each monitoring period 1006 after waiting for the waiting time 1008. For example, if the monitoring period is 3 seconds and the waiting time is 2 seconds, then initially the number of buffer credits is set to 16 (the default value), and after the first monitoring period of 3 seconds and the waiting time of 2 seconds, the number of buffer credits is incremented by 16 to become 32 if needed. Subsequently, after the second monitoring period of 3 seconds and the waiting time of 2 seconds, the number of buffer credits in incremented by 16 to become 48. Instead of an increment value, a multiplier of buffer credits may be used for increasing the buffer credit. For example, with a multiplier of 2, buffer credits may increase from 16 to 32 and then to 61 and then to 128.

Figure 11:
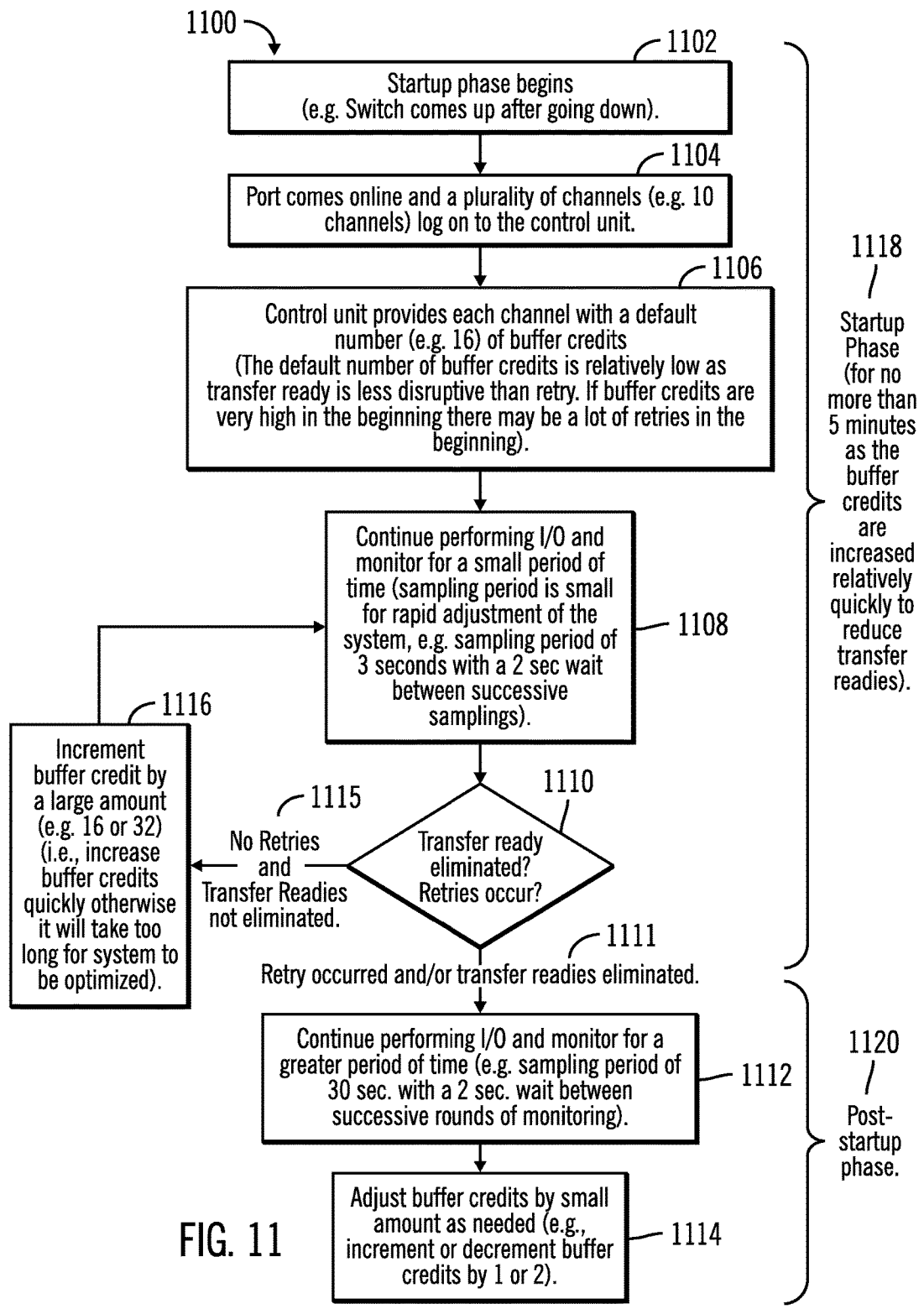
FIG. 11 illustrates a fifth flowchart that shows operations performed during a startup phase and a post-startup phase, in accordance with certain embodiments.

FIG. 11 illustrates a fifth flowchart 1100 that shows operations performed during a startup phase and a post-startup phase, in accordance with certain embodiments. The operations shown in FIG. 11 may be implemented in the control unit 102 and may be performed by the control unit application 114.

Control starts at block 1102 in which the startup phase begins. For example, in certain embodiments the startup phase may begin if the switch 112 goes down and then comes back up once again. Control proceeds to block 1104 when one or more ports come online and a plurality of channels (e.g. 10 channels, such as channels 104 . . . 108) log on to the control unit 102.

Control proceeds to block 1106 in which the control unit 102 provides each channel with a default number (e.g., 16) of buffer credits. The default number of buffer credits is relatively low as transfer ready is less disruptive than retry. If buffer credits are set to a very high value in the beginning there may be a lot of retries in the beginning and this may slow down the system.

Control proceeds to block 1108 in which the I/O is performed and the control unit 102 monitors the transfer ready operations and the retry operations for a small period for time such as 3 seconds. The monitoring period (i.e., the sampling period) is relatively small for rapid adjustment of the system by changing the buffer credit relatively quickly. For example, the buffer credit is incremented via an increment value or a multiplier every 5 seconds with a monitoring period of 3 seconds and a waiting time between successive monitoring of 2 seconds.

From block 1108 control proceeds to block 1110 in which a determination is made as to whether during monitoring it was determined whether all transfer readies were eliminated or whether retry operations occurred. If all transfer readies were eliminated or any retry operations occurred then the startup phase is over (reference numeral 1118 shows the startup phase) and control proceeds via branch 1111) to block 1112.

At block 1112, I/O is continued to be performed and monitoring of transfer ready operations and retry operations are performed for a greater period of time in comparison to the startup phase (e.g., for 30 seconds) with a waiting period (e.g., 2 seconds) between successive rounds of monitoring. After the startup phase is over and a reasonable value of the buffer credit has been assigned there is no need to change the buffer credit too frequently in the post-startup phase shown via reference numeral 1120.

From block 1112 control proceeds to block 1114 in which the buffer credits are adjusted by small amounts as needed. For example the buffer credits may be incremented or decremented by values of up to 2) and control returns to block 1112. The loop formed by blocks 1112 and 1114 was described in some detail with respect to other aspects of the embodiments in FIG. 7.

If at block 1110 a determination is made that no retry operations have occurred during the monitoring period and transfer readies have not been eliminated (branch 1115) then control proceeds to block 1116 in which the buffer credit is incremented by a large amount (e.g. 16 or 32) either via a fixed value or via a multiplier or via some other mechanism. The buffer credit is increased quickly otherwise it will take too long for the system to be optimized. Subsequently control returns to block 1108.

The startup phase 118 may in certain embodiments may be over in less than 5 minutes and this may be desired by the system. To achieve this buffer credits are increased relatively quickly.

Figure 12:
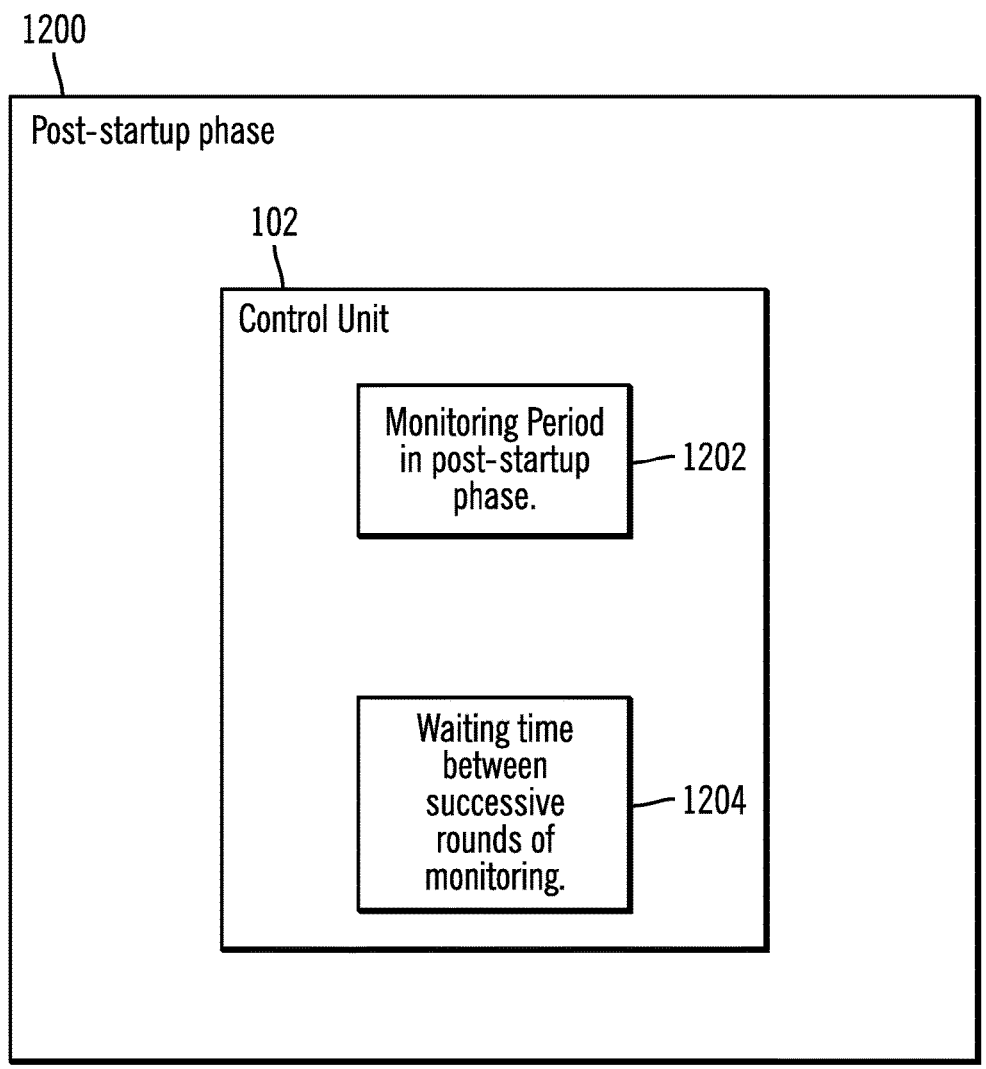
FIG. 12 illustrates a block diagram that shows certain additional parameters adjusted during a post-startup phase, in accordance with certain embodiments.

FIG. 12 illustrates a block diagram 1200 that shows certain additional parameters adjusted during a post-startup phase, in accordance with certain embodiments.

In the post-startup phase the control unit 102 may include additional indicators indicating the monitoring period in the post-startup phase (reference numeral 1202) and a waiting time between successive rounds of monitoring (reference numeral 1204). For example, in certain embodiments the monitoring period 1202 may be 30 seconds and the waiting time 1204 may be 2 seconds. The monitoring period in the post-startup phase may be considerably larger in comparison to the monitoring period in the startup phase as there is no need to change the buffer credit as quickly as in the startup phase where the buffer credit is quickly increased from a default value.

Figure 13:
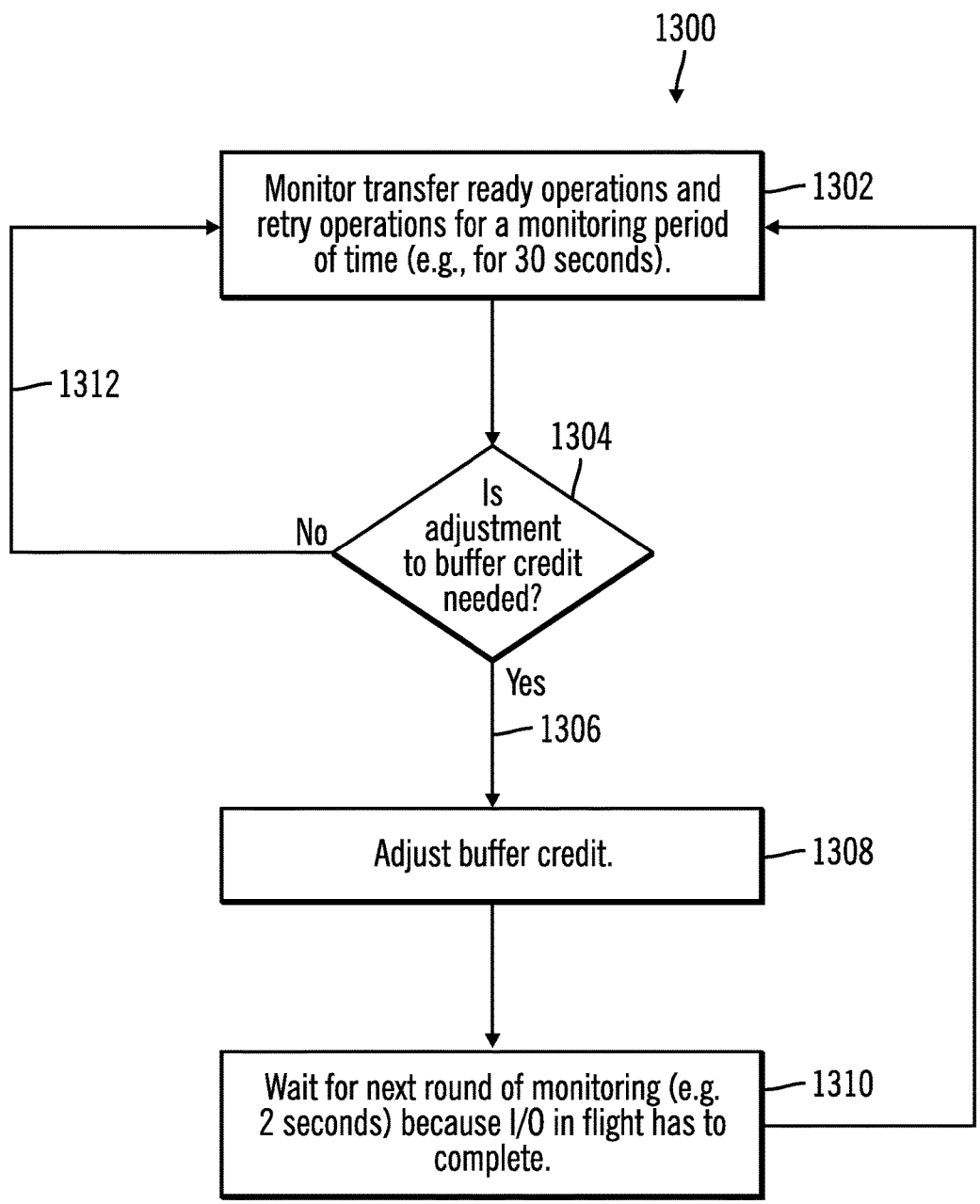
FIG. 13 illustrates a sixth flowchart that shows operations for monitoring and waiting between monitoring rounds in a post-startup phase, in accordance with certain embodiments.

FIG. 13 illustrates a sixth flowchart 1300 hat shows operations for monitoring and waiting between monitoring rounds in the post-startup phase, in accordance with certain embodiments. The operations shown in FIG. 13 may be implemented in the control unit 102 and may be performed by the control unit application 114.

Control starts at block 1302 in which the control unit 102 monitors transfer ready operations and retry operations for a period of time (e.g. for 30 seconds). Control proceeds to block 1304 in which a determination is made as to whether adjustment of buffer credit is needed to improve performance of the system (as shown via operations shown in at least FIG. 7). If so ("Yes" branch: reference numeral 1306), control proceeds to block 1308 in which the buffer credit is adjusted. If not ("No" branch: reference numeral 1312) control returns to block 1302 for continued monitoring.

From block 1308 control proceeds to block 1310 where a waiting is performed before the next round of monitoring as I/O operations in flight have to complete. For example, in certain embodiments after a 2 second wait, control returns to block 1302 for the next round of monitoring.

In certain embodiments, in the post-startup phase the buffer credits may be increased or decreased by a fixed number, such as 16. However, in alternative embodiments in the post-startup phase the buffer credits may be adjusted by a variable number and one such embodiment is provided in FIG. 14.

Figure 14:
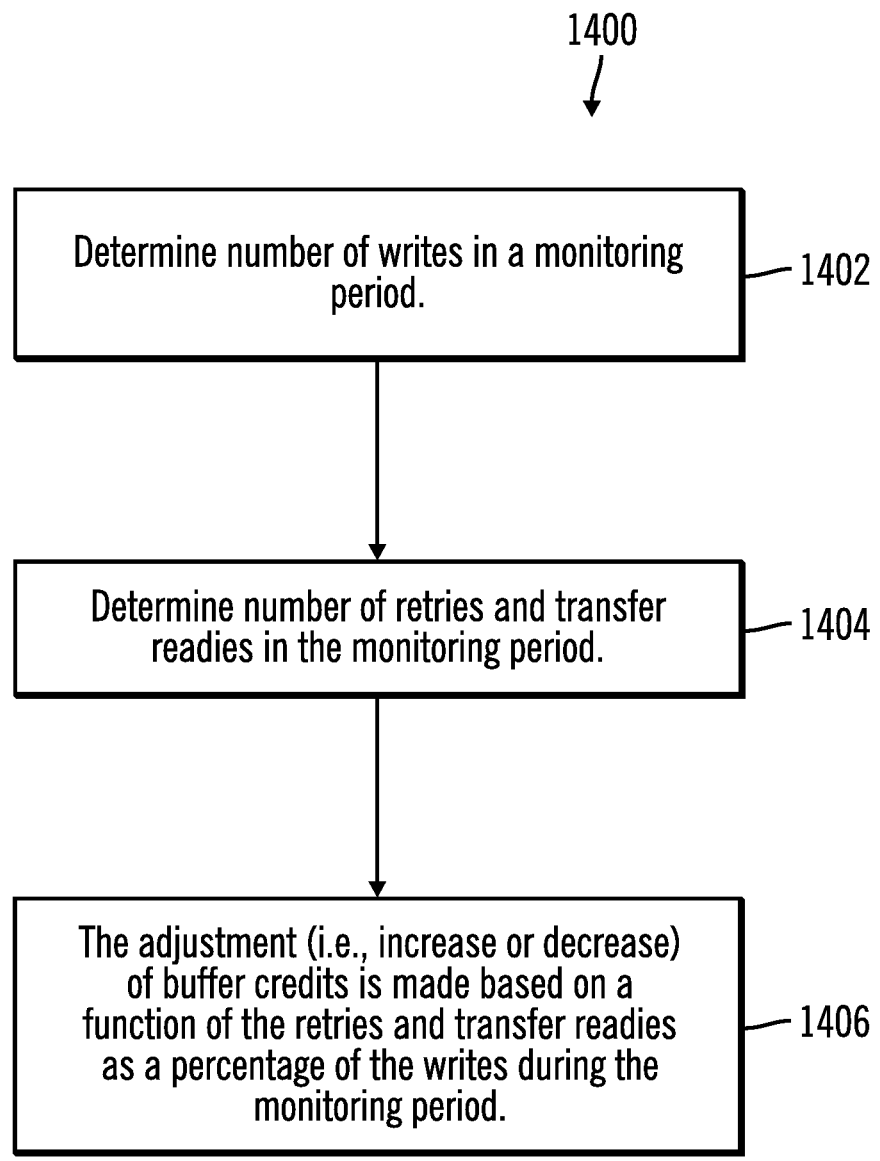
FIG. 14 illustrates a seventh flowchart that shows adjustment of buffer credits based on the number of retries and transfer readies as a percentage of the writes, in accordance with certain embodiments.

FIG. 14 illustrates a seventh flowchart 1400 that shows adjustment of buffer credits based on the number of retries and transfer readies as a percentage of the writes, in accordance with certain embodiments.

Control starts at block 1402 in which the control unit 1402 determines the number of writes in a monitoring period and also determines (at block 1404) the number of retries and transfer readies in the monitoring period. The adjustment (i.e., increase or decrease) of buffer credit is made based on a function of the retries and transfer readies as a percentage of the writes during the monitoring period. It should be noted that the adjustment of credit is not based on just the number of retries or transfer readies but takes into account the total number of writes that occurred in the monitoring period. It is based on percentages and not absolute counts of retries or transfer readies. This way, the adjustment of credit is not affected by the sample size.

Figure 15:
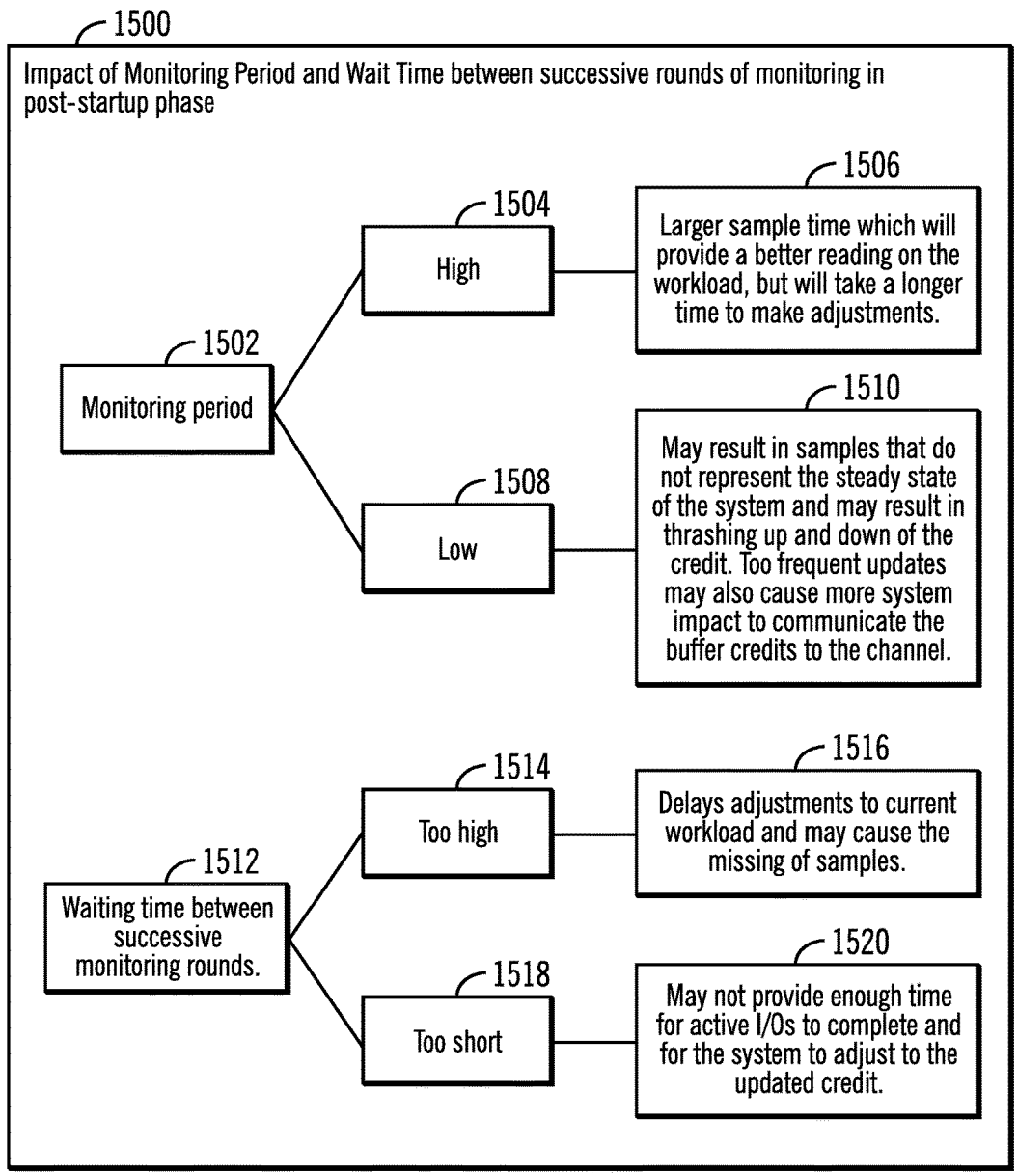
FIG. 15 illustrates a block diagram that shows the impact of monitoring period and wait time between successive rounds of monitoring in a post-startup phase, in accordance with certain embodiments.

FIG. 15 illustrates a block diagram 1500 that shows the impact of monitoring period (reference numeral 1502) and wait time between successive rounds of monitoring (reference numeral 1512) in a post-startup phase, in accordance with certain embodiments.

If the amount of time used for monitoring is high (reference numeral 1504) it provides for a larger sample time which may provide a better reading on the workload, but it may take a longer time to make adjustments to the buffer credit (shown via reference numeral 1506). In certain embodiments, the adjustments to the buffer credit are made are a fixed increment or decrement (e.g. 16) of the current buffer credit. In other embodiments as shown in FIG. 14 earlier, the size of the increment or decrement of the buffer credit depends on the number of transfer readies and retries as a percentage of the writes. It may be noted, that a larger monitoring time does not take more resources for monitoring, as the counting of the transfer readies or retries occurs on every I/O regardless of the monitoring time.

Too small a monitoring period (i.e., monitoring period is low 1508) could result in samples that do not represent the steady state of the system and may result in thrashing up and down of the buffer credit. Too frequent updates also causes more system impact to communicate the buffer credits to the channel (as shown via reference numeral 1510).

The impact of the wait time is such that that waiting too long (reference numeral 1514) may delay adjustments to the current workload and may cause the system to miss samples (reference numeral 1516). Too short of a wait time (reference number 1518) may not provide enough time for active I/Os to complete and for the system to adjust to the updated buffer credit (reference numeral 1520).

Figure 16:
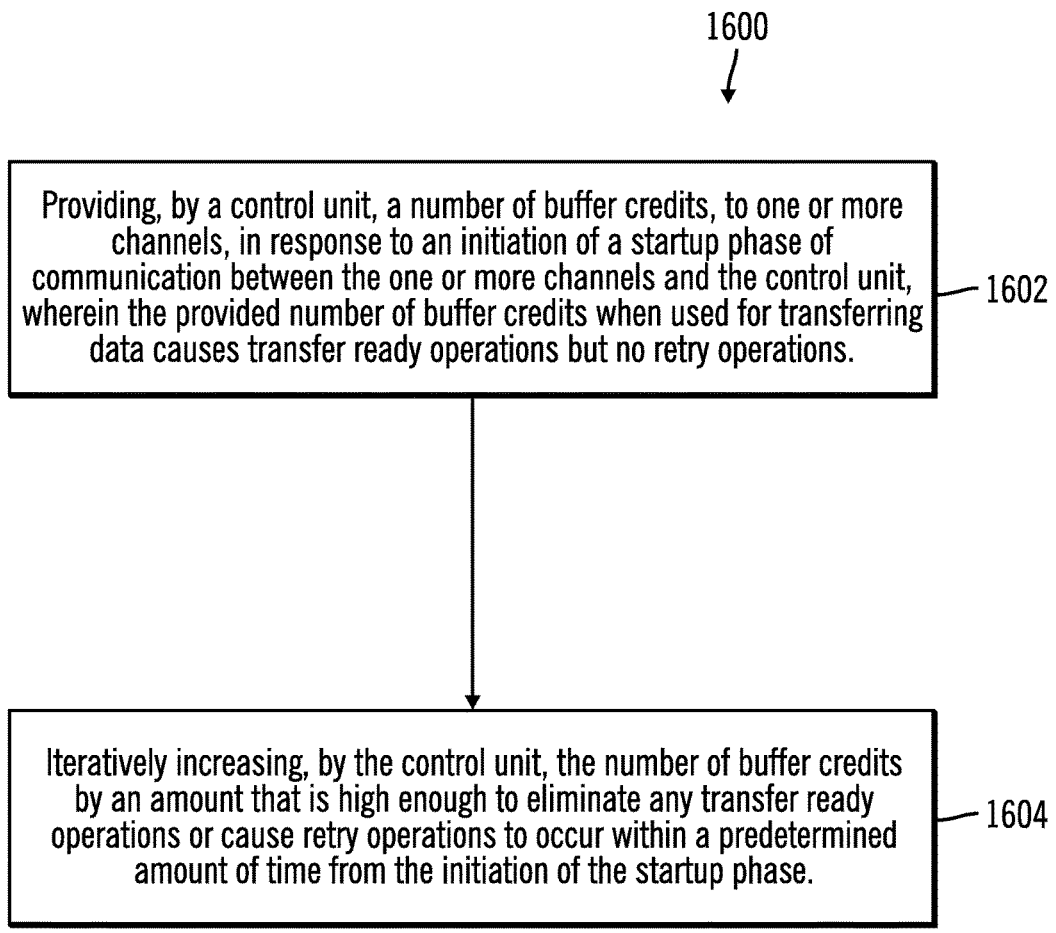
FIG. 16 illustrates an eighth flowchart that shows operations for increasing buffer credits in a startup phase, in accordance with certain embodiments.

FIG. 16 illustrates an eighth flowchart 1600 that shows operations for increasing buffer credits in a startup phase, in accordance with certain embodiments. The operations shown in FIG. 16 may be implemented in the control unit 102 and may be performed by the control unit application 114.

Control starts at block 1602 in which a control unit 102 provides a number of buffer credits (e.g., 16), to one or more channels 104, 106, . . . , 108, in response to an initiation of a startup phase of communication between the one or more channels 104, 106, . . . , 108 and the control unit 102, where the provided number of buffer credits when used for transferring data causes transfer ready operations but no retry operations. The control unit 102 iteratively increases (at block 1604) the number of buffer credits by an amount (e.g., increase of 16 or 32 or increase via a multiplier) that is high enough to eliminate any transfer ready operations or cause retry operations to occur within a predetermined amount of time (e.g. 5 minutes) from the initiation of the startup phase. As a result, an optimum number of buffer credits is reached within the predetermined amount of time, e.g., the optimum number of buffer credits may be reached in 5 minutes from the initiation of the startup phase of communication.

Figure 17:
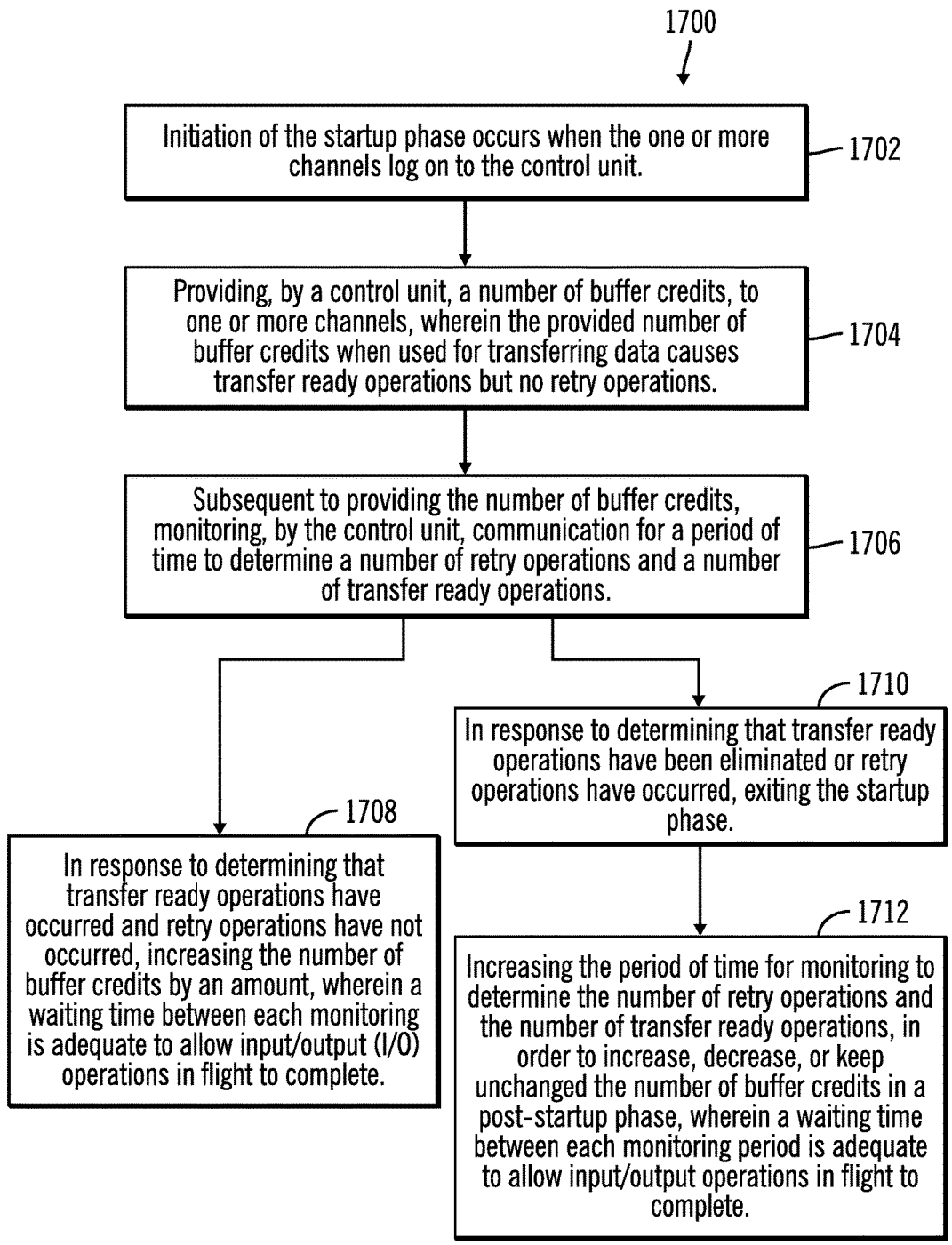
FIG. 17 illustrates an ninth flowchart that shows operations for increasing buffer credits in a startup phase and for adjusting other parameters in a startup and post-startup phase, in accordance with certain embodiments.

FIG. 17 illustrates an ninth flowchart 1700 that shows operations for increasing buffer credits in a startup phase and for adjusting other parameters in a startup and post-startup phase, in accordance with certain embodiments. The operations shown in FIG. 17 may be implemented in the control unit 102 and may be performed by the control unit application 114.

Control starts at block 1702 in which the initiation of the startup phase occurs when the one or more channels 104 . . . 108 log on to the control unit 102. Control proceeds to block 1704 in which the control unit 102 provides a number of buffer credits, to one or more channels 104 . . . 108, in response to the initiation of a startup phase of communication between the one or more channels and the control unit 102, where the provided number of buffer credits when used for transferring data causes transfer ready operations but no retry operations.

Subsequent to providing the number of buffer credits, the control unit 102 monitors communication (at block 1706) for a period of time to determine a number of retry operations and a number of transfer ready operations. As a result, the control unit 102 may determine how efficiently the system is performing I/O operations.

From block 1706 control proceeds in parallel to block 1708 and 1710.

At block 1708, subsequent to the monitoring, the control unit 102 in response to determining that transfer ready operations have occurred and retry operations have not occurred, increases the number of buffer credits by an amount (via a fixed increment or via a multiplier or via some other mechanism), where a waiting time between each monitoring period is adequate to allow I/O operations in flight to complete.

At block 1710, subsequent to the monitoring in response to determining that transfer ready operations have been eliminated or retry operations have occurred, the startup phase is exited. As a result, within the predetermined amount of time the startup phase is exited with the buffer credit set to a high enough value for the post-startup phase of operation.

At block 1712, in response to the exiting of the startup phase, an increase is made in the period of time for monitoring to determine the number of retry operations and the number of transfer ready operations, to increase, decrease, or keep unchanged, the number of buffer credits in a post-startup phase. As a result, in the post-startup phase the monitoring period is increased and changes are made to the buffer credit less frequently than in the startup phase.

Therefore FIGS. 10-17 illustrate certain embodiments in which during a startup phase the buffer credit starts with a predetermined value and is quickly increased by relatively large increments such that the startup phase is exited quickly in about 5 minutes or less. Subsequently in the post-startup phase the buffer credit is changed relatively slowly and the change is in smaller increments or decrements in comparison to the startup phase.

Receiving of Buffer Credits by Channels for Transmitting Data

While the control unit 102 determines the adjustment of buffer credits both during the startup phase and during the post-startup phase, the channels that communicate with the control unit 102 performs operations for communication with the control unit 102 based at least on the buffer credits received from the control unit 102. FIGS. 18-22 describe certain operations performed at least by the channels included in host computational devices that communicate with the control unit 102.

Figure 18:
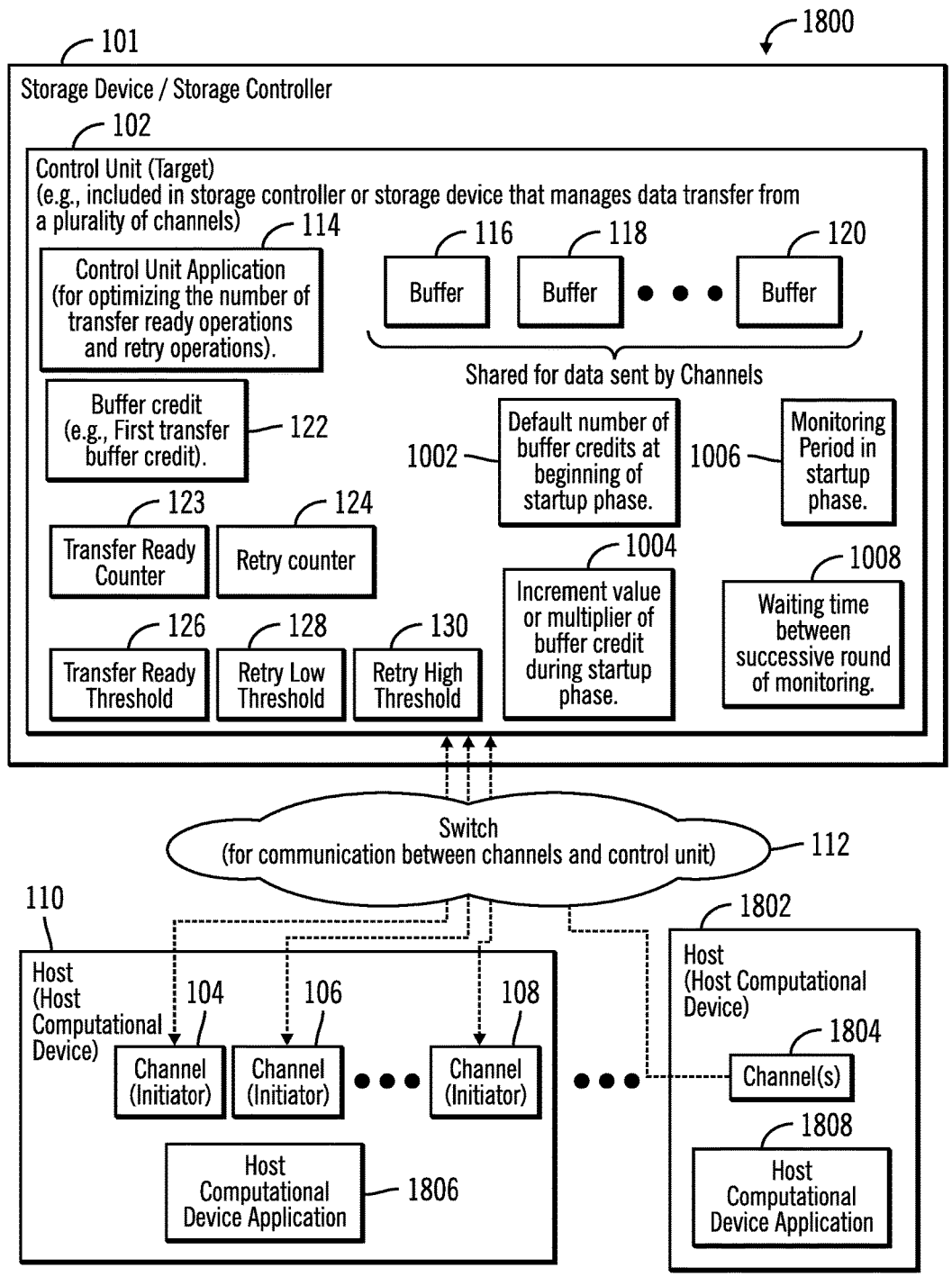
FIG. 18 illustrates a block diagram of a plurality of hosts including a plurality of channels in communication with a control unit of a storage controller via one or more switches, in accordance with certain embodiments.

FIG. 18 illustrates a block diagram 1800 of a plurality of hosts 100 . . . 1802 including a plurality of channels 104, 106, . . . , 108, 1804 in communication with a control unit 102 of a storage controller 101 via one or more switches 112, in accordance with certain embodiments. Each host of the plurality of hosts may also be referred to as a host computational device.

The elements included within the control unit 102 have been described earlier in FIGS. 1-18 and in the description of FIGS. 1-18.

The plurality of hosts 110 . . . 1802 may include any suitable computational device including those presently known in the art, such as, a personal computer, a workstation, a server, a mainframe, a hand held computer, a palm top computer, a telephony device, a network appliance, a blade computer, a processing device, etc.

Each host of the plurality of hosts 110 . . . 1802 may communicate with the control unit 102 of the storage controller 101 (where the storage controller 101 may be a storage device or a computational device or any other device) via one or more channels over one or more switches 112. For example, in certain embodiments, the host 110 may include a plurality of channels shown via reference numerals 104, 106, . . . 108, and the host 1802 may include a plurality of channels shown via reference numeral 1804.

Each host of the plurality of hosts 110 . . . 1802 also includes a host computational device application (e.g., 1806, 1808) implemented in software, hardware, firmware or any combination thereof. The host computational device applications 1806, 1808 control the communication of the channels 104, 106, . . . 108, 1804 to the control unit 102.

Figure 19:
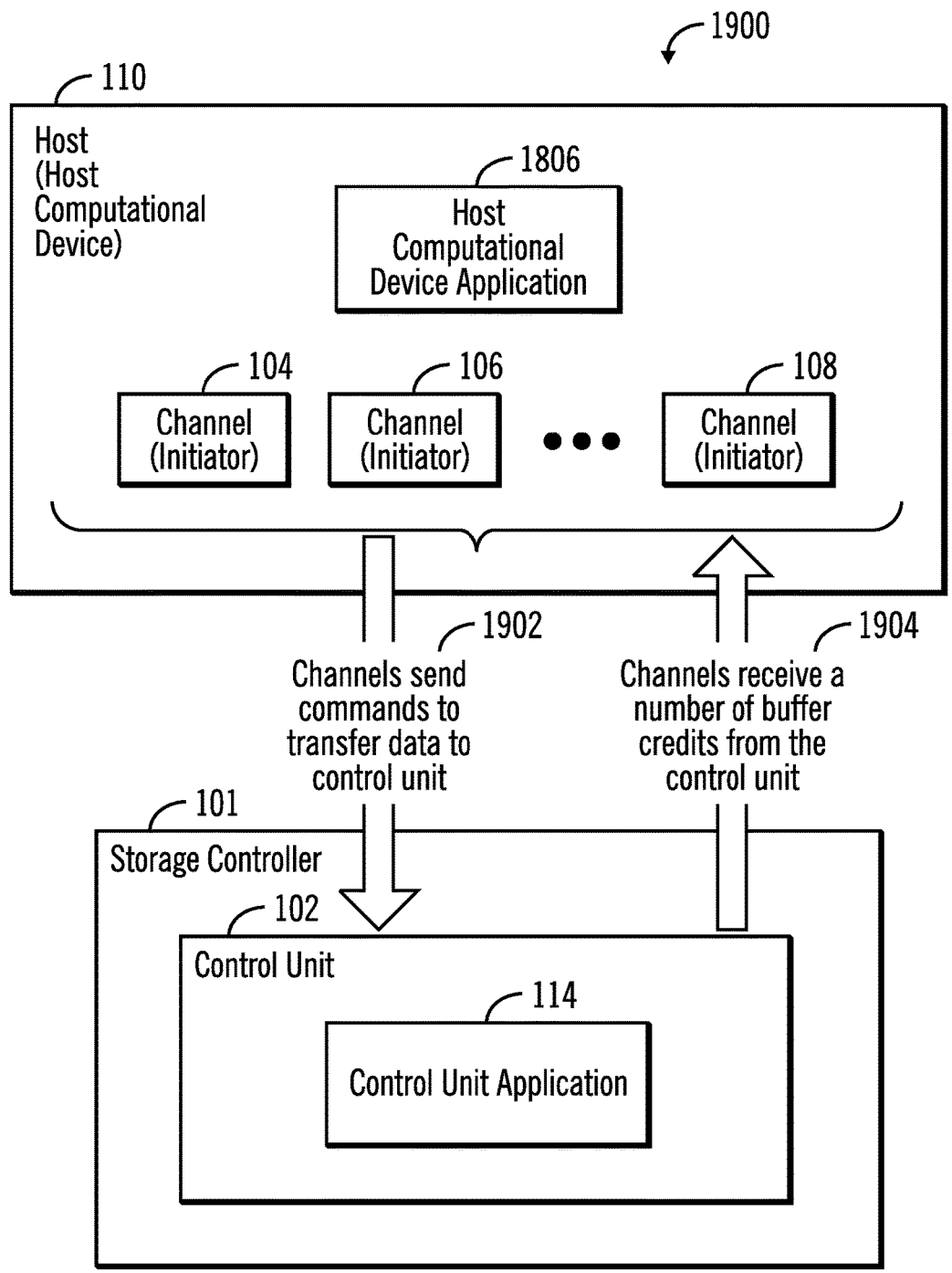
FIG. 19 illustrates a block diagram of channels sending a command to transfer data to a control unit and the channels receiving a number of buffer credits from the control unit, in accordance with certain embodiments.

FIG. 19 illustrates a block diagram 1900 that shows channels 104, 106, . . . , 108 sending a command to transfer data to a control unit 102 and the channels 104, 106, . . . 1808 receiving a number of buffer credits from the control unit 102, in accordance with certain embodiments.

The host computational device application 1806 of the host 110 controls the communication of the channels 104, 106, . . . , 108 to the control unit 102 of the storage controller 101. One or more of the channels 104, 106, . . . 106 send commands to transfer data to the control unit 102 (as shown via reference numeral 1902). In response, the channels 104, 106, 108 periodically receive a number of buffer credits from the control 102 for use in subsequent data transfers to the control unit 102 (as shown via reference numeral 1904).

Figure 20:
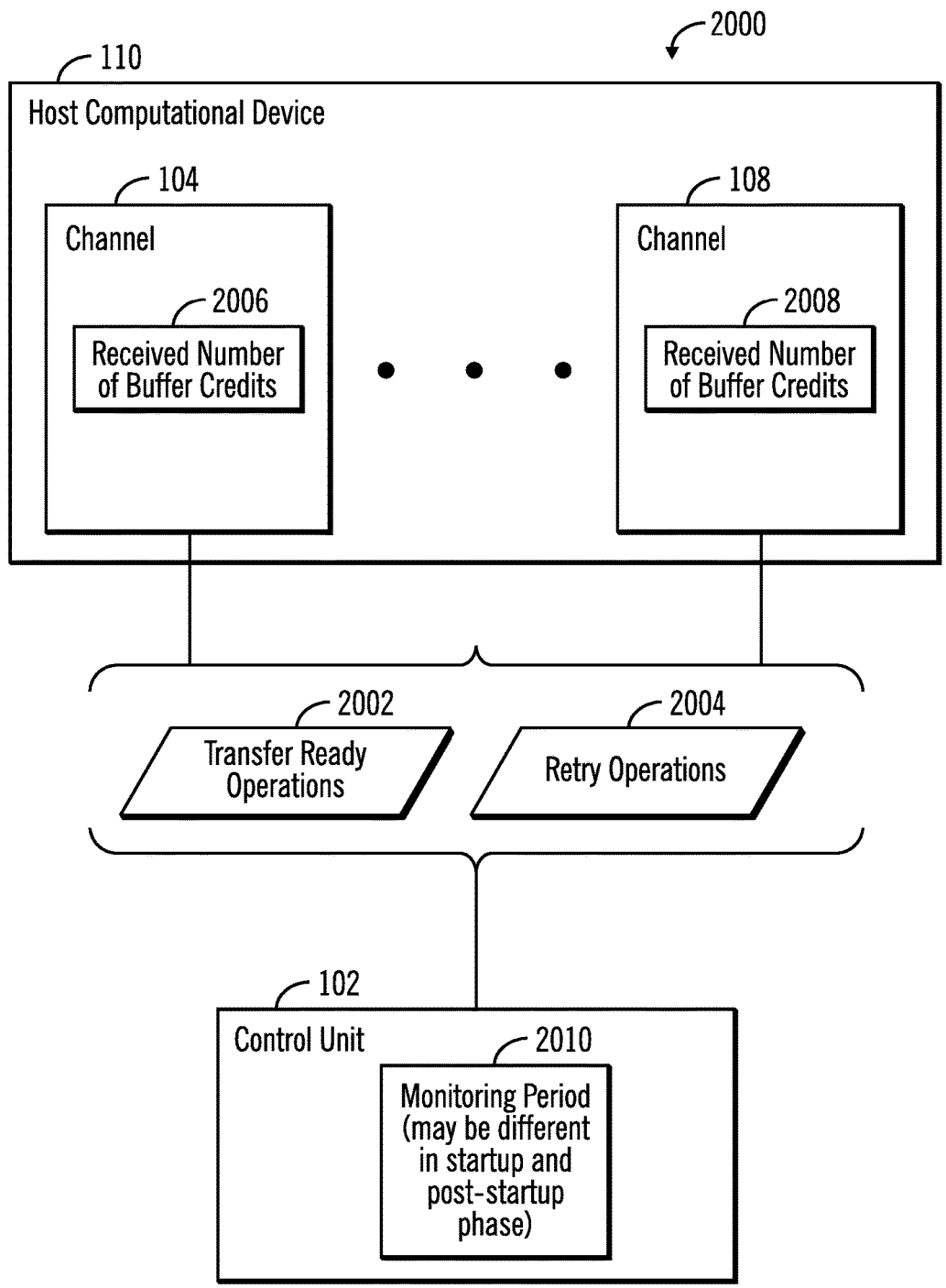
FIG. 20 illustrates a block diagram of channels that perform transfer ready operations and retry operations while communicating with a control unit and receive a number of buffer credits from the control unit, based on an analysis by the control unit of the number of transfer ready operations and the number of retry operations, in accordance with certain embodiments.

FIG. 20 illustrates a block diagram 2000 of channels 104 . . . 108 that perform transfer ready operations 2002 and retry operations 2004 while communicating with a control unit 102, where the channels 104 . . . 108 receive a number of buffer credits 2006 . . . 2008 from the control unit 102, based on an analysis by the control unit 102 of the number of transfer ready operations and the number of retry operations during a period of time, in accordance with certain embodiments. The analysis performed by the control unit 102 to determine the number of buffer credits to provide have been described earlier in FIGS. 1-17.

The control unit 102 includes a monitoring period 2010 that may be different in a startup phase and in a post-startup phase as shown earlier via reference numeral 1006 in FIG. 10 and reference numeral 1202 in FIG. 12. During the monitoring period 2010 the control unit 102 monitors transfer ready operations and retry operations for determining the number of buffer credits to indicate to each of the channels 104 . . . 108.

Figure 21:
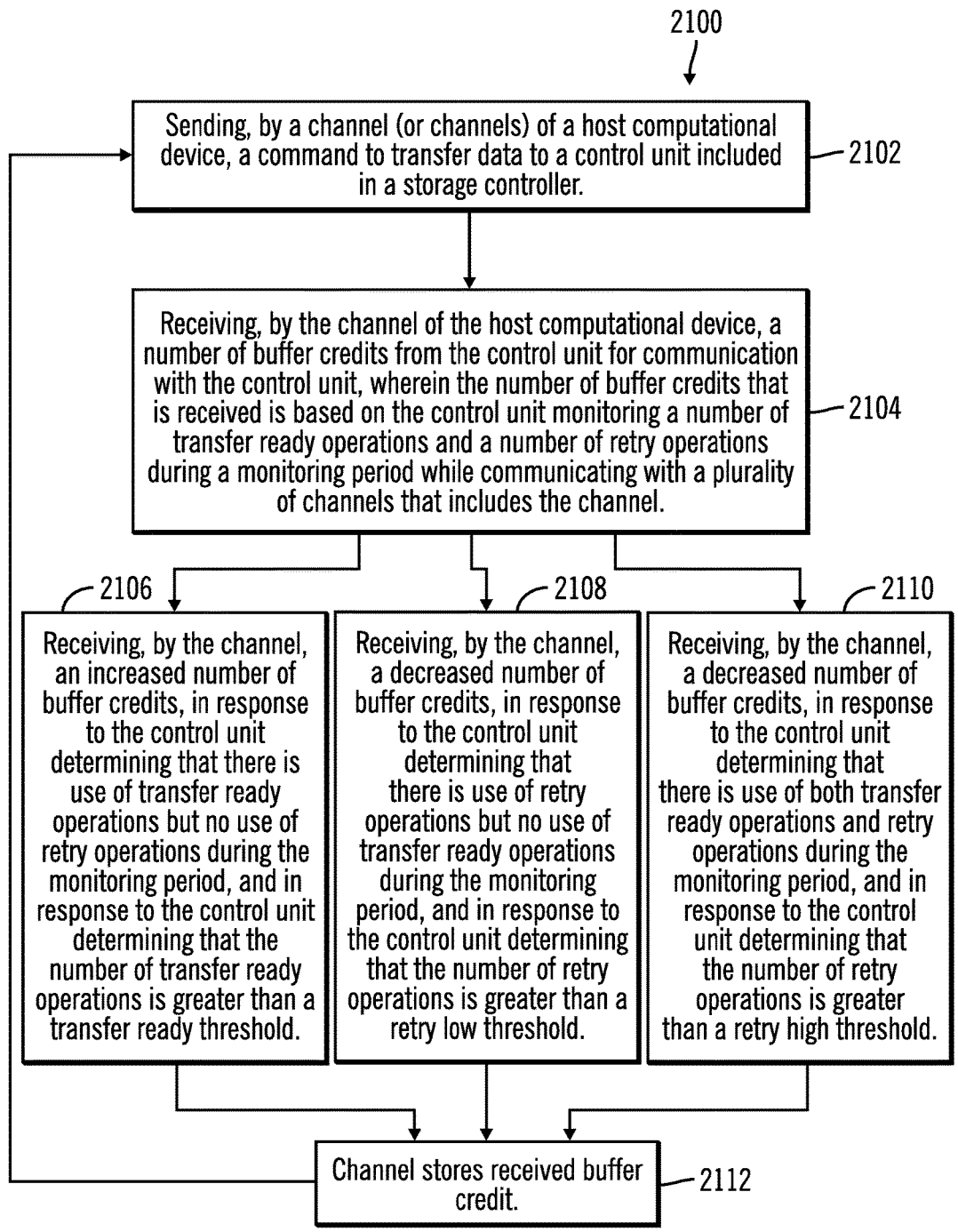
FIG. 21 illustrates a tenth flowchart that shows operations performed by one or more channels of a plurality of channels included in one or more hosts, in accordance with certain embodiments.

FIG. 21 illustrates a tenth flowchart 2100 that shows operations performed by one or more a plurality of channels 104 . . . 108, 1804 included in one or more hosts 110 . . . 1802, in accordance with certain embodiments. The operations shown in FIG. 21 may be performed in the one or more hosts 110 . . . 1802 via the host computational device applications 1806 . . . 1808 and/or the channels 104 . . . 108, 1804.

Control starts at block 2102 in which a channel (e.g., channel 104) of a host computational device 110 sends a command to transfer data to a control unit 102 included in a storage controller 101.

Control proceeds to block 2104 in which the channel 104 of the host computational device 110 receives a number of buffer credits 2006 from the control unit 102 for communication with the control unit 102, where the number of buffer credits 2006 that is received is based on the control unit 102 monitoring a number of transfer ready operations 2002 and a number of retry operations 2004 during a monitoring period 2010 while communicating with a plurality of channels 104 . . . 108, 1804 that includes the channel 104. In certain embodiments, each of the plurality of channels 104 . . . 108, 1804 receives an identical number of buffer credits from the control unit 102.

From block 2104, control may proceed in parallel to block 2106, 2108 and 2110. In block 2106, the channel 104 receives an increased number of buffer credits, in response to the control unit 102 determining that there is use of transfer ready operations but no use of retry operations during the monitoring period, and in response to the control unit 102 determining that the number of transfer ready operations is greater than a transfer ready threshold 126.

In block 2108, the channel 104 receives a decreased number of buffer credits, in response to the control unit 102 determining that there is use of retry operations but no use of transfer ready operations during the monitoring period, and in response to the control unit determining that the number of retry operations is greater than a retry low threshold 128.

In block 2110, the channel 104 receives a decreased number of buffer credits, in response to the control unit 102 determining that there is use of both transfer ready operations and retry operations during the monitoring period, and in response to the control unit 102 determining that the number of retry operations is greater than a retry high threshold 130.

From blocks 2106, 2108, 2110, after the channel 104 (or each of the plurality of channels 104 . . . 108, 1804) receives the increased or decreased number of buffer credits, the channel stores the received number of buffer credits (as shown via reference numeral 2112) and control proceeds to block 2102 for further sending of commands from the channel(s) 104 . . . 108, 1804 to the control unit 102.

Therefore, FIG. 21 illustrates certain embodiments in which the channels 104 . . . 108, 1804 communicate data to the control unit 102 based on a number of received buffer credits that the channels 104 . . . 108, 1804 receive from the control unit 102.

Figure 22:
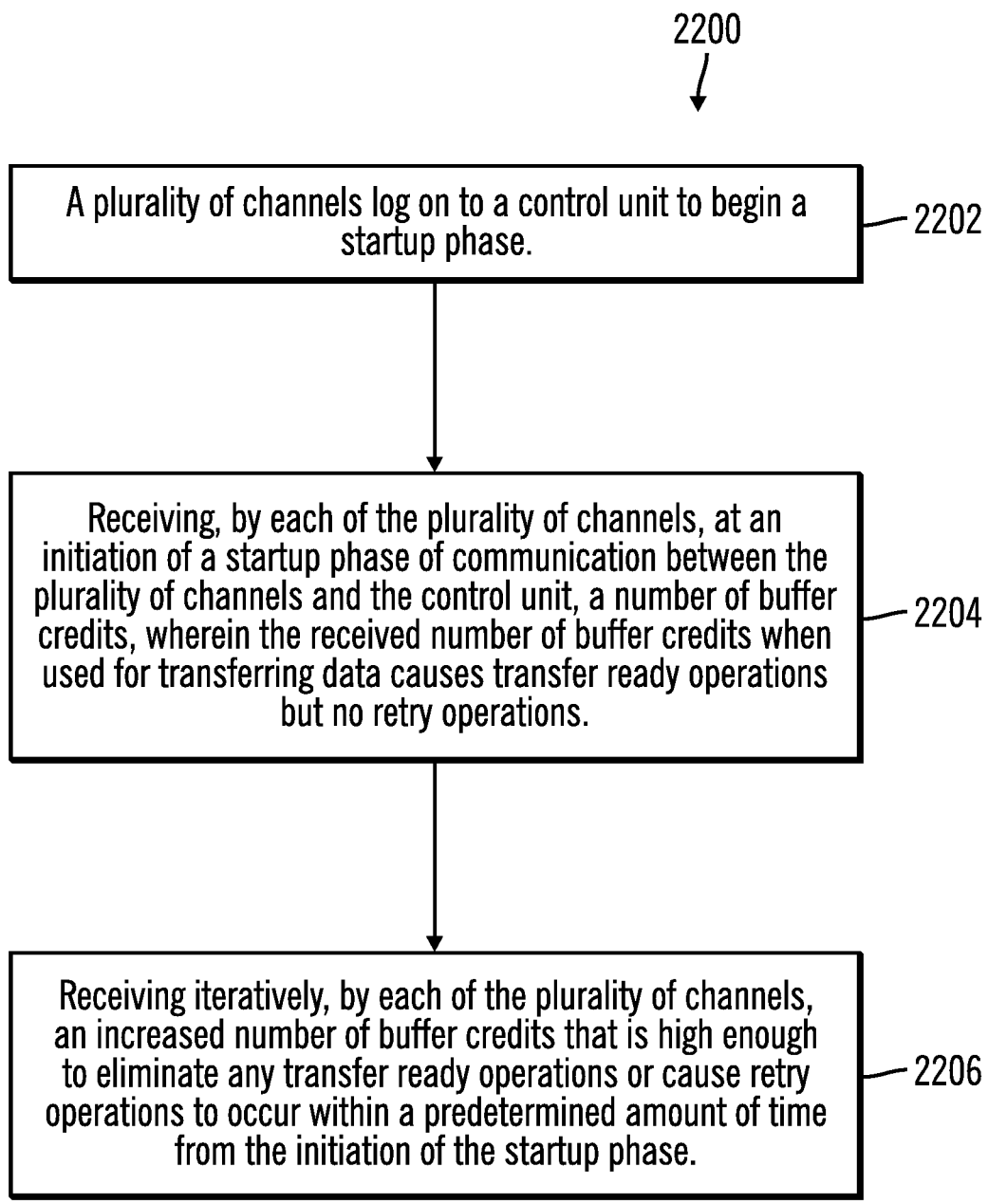
FIG. 22 illustrates an eleventh flowchart that shows operations performed by one or more channels of a plurality of channels included in one or more hosts, in accordance with certain embodiments.

FIG. 22 illustrates an eleventh flowchart that shows operations performed by one or more a plurality of channels 104 . . . 108, 1804 included in one or more hosts 110 . . . 1802 during a startup phase of communications with the control unit 102, in accordance with certain embodiments. The operations shown in FIG. 22 may be performed in the one or more hosts 110 . . . 1802 via the host computational device applications 1806 . . . 1808 and/or the channels 104 . . . 108, 1804.

Control starts at block 2202 in which a plurality of channels 104 . . . 108, 1804 log on to a control unit 102 to begin a startup phase.

Control proceeds to block 2204, in which each of the plurality of channels 104 . . . 108, 1804 receives at an initiation of the startup phase of communication between the plurality of channels 104 . . . 108, 1804 and the control unit 102, the number of buffer credits, where the received number of buffer credits when used for transferring data causes transfer ready operations but no retry operations.

Control proceeds to block 2206, where each of the plurality of channels 104 . . . 108, 1804 receives iteratively an increased number of buffer credits that is high enough to eliminate any transfer ready operations or cause retry operations to occur within a predetermined amount of time (e.g., 5 minutes) from the initiation of the startup phase.

Therefore FIGS. 18-22 illustrate operations performed at least in one or more channels included in host computational devices. The operations include transfer of data to the control unit based on the received indication of buffer credits from the control unit.

EXAMPLES

In a first embodiment of a first set of embodiments, a control unit monitors a number of transfer ready operations and a number of retry operations during a monitoring period during communication with a plurality of channels. Based, on the monitoring, a number of buffer credits for communication with the plurality of channels is adjusted.

In a second embodiment of the first set of embodiments, the subject matter of the first embodiment may include that the adjusting of the number of buffer credits is performed to place the number of transfer ready operations and the retry operations relative to a number of write operations within a predetermined operating range. As a result, the system avoids performing too many retries or transfer readies.

In a third embodiment of the first set of embodiments, the subject matter of the first embodiment or the second embodiment may include that an adjusted number of transfer ready operations is determined for adjusting the number of buffer credits, by subtracting a number of operations that are requested to be retried from a total number of transfer ready operations. As a result, the transfer ready operations caused as a result of retries are accounted for.

In a fourth embodiment of the first set of embodiments, the subject matter of the first embodiment may include that in response to determining that there is use of transfer ready operations but no use of retry operations during the monitoring period, and in response to determining that the number of transfer ready operations is greater than a transfer ready threshold, the number of buffer credits is increased. In response to determining that the number of transfer ready operations is not greater than the transfer ready threshold, the control unit continues to monitor the number of transfer ready operations and the number of retry operations during an additional monitoring period during communication with the plurality of channels.

In a fifth embodiment of the first set of embodiments, the subject matter of the first embodiment may include that in response to determining that there is use of retry operations but no use of transfer ready operations during the monitoring period, and in response to determining that the number of retry operations is greater than a retry low threshold, the number of buffer credits is decreased. In response to determining that the number of retry operations is not greater than the retry low threshold, the control unit continues to monitor the number of transfer ready operations and the number of retry operations during an additional monitoring period during communication with the plurality of channels.

In a sixth embodiment of the first set of embodiments, the subject matter of the first embodiment may include that in response to determining that there is use of both transfer ready operations and retry operations during the monitoring period, and in response to determining that the number of retry operations is greater than a retry high threshold, the number of buffer credits is decreased.

In a seventh embodiment of the first set of embodiments, the subject matter of the sixth embodiment may include that in response to determining that the number of retry operations is not greater than a retry high threshold, the control unit continues to monitor the number of transfer ready operations and the number of retry operations during an additional monitoring period during communication with the plurality of channels.

In an eighth embodiment of the first set of embodiments, the subject matter of the first embodiment may include that in response to determining that there is use of transfer ready operations but no use of retry operations during the monitoring period, and in response to determining that the number of transfer ready operations is greater than a transfer ready threshold, the number of buffer credits is increased. Additionally, in response to determining that there is use of retry operations but no use of transfer ready operations during the monitoring period, and in response to determining that the number of retry operations is greater than a retry low threshold, the number of buffer credits is decreased. Furthermore, in response to determining that there is use of both transfer ready operations and retry operations during the monitoring period, and in response to determining that the number of retry operations is greater than a retry high threshold, the number of buffer credits is decreased.

In a ninth embodiment of the first set of embodiments, a storage controller in communication with one or more hosts, the storage controller comprising a memory, and a processor coupled to the memory, where the processor performs operations, the operations comprising: monitoring, by a control unit of the storage controller, a number of transfer ready operations and a number of retry operations during a monitoring period during communication with a plurality of channels of the one or more hosts; and based, on the monitoring, adjusting a number of buffer credits for communication with the plurality of channels of the one or more hosts.

In a first embodiment of a second set of embodiments, a control unit provides a number of buffer credits, to one or more channels, in response to an initiation of a startup phase of communication between the one or more channels and the control unit, where the provided number of buffer credits when used for transferring data causes transfer ready operations but no retry operations. The control unit iteratively increases the number of buffer credits by an amount that is high enough to eliminate any transfer ready operations or cause retry operations to occur within a predetermined amount of time from the initiation of the startup phase. As a result, the optimum number of buffer credits is reached within the predetermined amount of time, e.g., the optimum number of buffer credits may be reached in 5 minutes from the initiation of the startup phase of communication.

In a second embodiment of the second set of embodiments, the subject matter of the first embodiment may include that the initiation of the startup phase occurs when the one or more channels log on to the control unit.

In a third embodiment of the second set of embodiments, the subject matter of the first embodiment may include that subsequent to providing the number of buffer credits, the control unit monitors communication for a period of time to determine a number of retry operations and a number of transfer ready operations. As a result, the control unit may determine how efficiently the system is performing input/output (I/O) operations.

In a fourth embodiment of the a second set of embodiments, the subject matter of the third embodiment may include that subsequent to the monitoring, the control unit in response to determining that transfer ready operations have occurred and retry operations have not occurred, increases the number of buffer credits by the predetermined amount.

In a fifth embodiment of the second set of embodiments, the subject matter of the fourth embodiment may include that subsequent to the monitoring in response to determining that transfer ready operations have been eliminated or retry operations have occurred, the startup phase is exited. As a result, within the predetermined amount of time the startup phase is exited with the buffer credit set to a high enough value for the post-startup phase of operation.

In a sixth embodiment of the second set of embodiments, the subject matter of the fifth embodiment may include that in response to the exiting of the startup phase, an increase is made in the period of time for monitoring to determine the number of retry operations and the number of transfer ready operations to increase, decrease, or keep unchanged, the number of buffer credits in a post-startup phase. As a result, in the post-startup phase the monitoring period is increased and changes are made to the buffer credit less frequently than in the startup phase.

In a seventh embodiment of the second set of embodiments, the subject matter of the sixth embodiment may include that if the period of time for monitoring is relatively high then a better reading on a workload is determined but a time to make adjustments to the buffer credit is increased, and wherein if the monitoring time is below a predetermined time that is relatively low then a thrashing on frequent up and down of the buffer credit occurs and more frequent updates of the buffer credits have to be sent to the one or more channels.

In an eighth embodiment of the second set of embodiments, the subject matter of the third embodiment may include that a waiting time between each monitoring is adequate to allow input/output (I/O) operations in flight to complete.

In a ninth embodiment of the second set of embodiments, a storage controller is in communication with one or more hosts, the storage controller comprising: a memory; and a processor coupled to the memory, wherein the processor performs operations, the operations comprising: providing, by a control unit of the storage controller, a number of buffer credits, to one or more channels, in response to an initiation of a startup phase of communication between the one or more channels and the control unit, wherein the provided number of buffer credits when used for transferring data causes transfer ready operations but no retry operations; and iteratively increasing, by the control unit of the storage controller, the number of buffer credits by an amount that is high enough to eliminate any transfer ready operations or cause retry operations to occur within a predetermined amount of time from the initiation of the startup phase.

In a first embodiment of a third set of embodiments, a channel of a host computational device sends a command to transfer data to a control unit included in a storage controller. The channel of the host computational device receives a number of buffer credits from the control unit for communication with the control unit, wherein the number of buffer credits that is received is based on the control unit monitoring a number of transfer ready operations and a number of retry operations during a monitoring period while communicating with a plurality of channels that includes the channel.

In a second embodiment of a third set of embodiments, the subject matter of the first embodiment may include that each of the plurality of channels receives an identical number of buffer credits from the control unit.

In a third embodiment of a third set of embodiments, the subject matter of the first or second embodiments may include that the channel receives an increased number of buffer credits, in response to the control unit determining that there is use of transfer ready operations but no use of retry operations during the monitoring period, and in response to the control unit determining that the number of transfer ready operations is greater than a transfer ready threshold.

In a fourth embodiment of a third set of embodiments, the subject matter of the first, second, or third embodiments may include that the channel receives a decreased number of buffer credits, in response to the control unit determining that there is use of retry operations but no use of transfer ready operations during the monitoring period, and in response to the control unit determining that the number of retry operations is greater than a retry low threshold.

In a fifth embodiment of a third set of embodiments, the subject matter of the first, second, third or fourth embodiments may include that the channel receives a decreased number of buffer credits, in response to the control unit determining that there is use of both transfer ready operations and retry operations during the monitoring period, and in response to the control unit determining that the number of retry operations is greater than a retry high threshold.

In a sixth embodiment of a third set of embodiments, the subject matter of the first, second, third, fourth, or fifth embodiments may include that each of the plurality of channels receives at an initiation of a startup phase of communication between the plurality of channels and the control unit, the number of buffer credits, where the received number of buffer credits when used for transferring data causes transfer ready operations but no retry operations.

Each of the plurality of channels receives iteratively an increased number of buffer credits that is high enough to eliminate any transfer ready operations or cause retry operations to occur within a predetermined amount of time from the initiation of the startup phase.

In a seventh embodiment of a third set of embodiments, the subject matter of the first, second, third, fourth, fifth or sixth embodiments may include that the initiation of the startup phase occurs when the plurality of channels log on to the control unit.

In an eighth embodiment of a third set of embodiments, a host computational device is in communication with a storage controller, the host computational device, comprising: a memory; and a processor coupled to the memory, wherein the processor performs operations, the operations comprising: sending, by a channel of the host computational device, a command to transfer data to a control unit included in a storage controller; and receiving, by the channel of the host computational device, a number of buffer credits from the control unit for communication with the control unit, wherein the number of buffer credits that is received is based on the control unit monitoring a number of transfer ready operations and a number of retry operations during a monitoring period while communicating with a plurality of channels that includes the channel.

Certain Additional Embodiments

In certain additional embodiments, the control unit determines how much data is transmitted by the channel and whether an additional transfer ready is needed when it receives a sequence initiative in Fibre Channel communications. During adjustments, care needs to be taken to avoid moving between too little credit (i.e., buffer credit) requiring multiple operations to use transfer ready and too much credit where multiple operations have to be retried.

The embodiments may use the following mechanisms:
(a) The control unit may determine that it has given out too much credit if it has to retry operations due to not having buffers available.
(b) The control unit may determine that a channel has insufficient credit if it is receiving operations that require transfer ready when retry is not being requested by the control unit.
(c) The control unit may determine that a channel has ideal credit if it does not see any operations requiring retry, or operations that require transfer ready.
(d) When a buffer shortage exists for a port, data may be dropped and retry may occur. The retried operations may be performed using transfer ready which may inherently slow the link data rate due to the introduction of data rate droop at distance, and the holding of data in the channel until buffers are available and transfer ready is received. This may, in turn, reduce the number of retries and result in stable operation.
(e) Dropping data at the control unit and performing retry does not hurt the control unit port as it does not consume control unit resources. It does affect the link rate due to retransmission (30% retries would result in using 30% more available bandwidth since at most one retransmission may occur. If the additional bandwidth is available, that is not an issue, but on expensive, long haul replication links, that bandwidth is expensive). Retries also affect the sender in that it consumes memory bandwidth for retransmission of the data.
(f) When a buffer shortage exists, the operations that are retried are those for which data is received at the time when zero buffers are available. Statistically, this may result in an even distribution of retries at all channels for which retry occurs. So, when reties occur, it is desirable in certain embodiments to reduce the credit for all channels at the same time, rather than reducing the credit for a single channel when a retries occur on that channel.
(g) Larger transfers that consume multiple buffers are more susceptible to getting retried than single buffer operations, but the effect on response time for a smaller operation is greater due to the ratio of data transfer time to processing time.
(h) Providing too much credit to a channel that does not need or use it does not cause too much problems for the system.
(i) Providing too little credit to a channel may result in use of transfer ready. When there are sufficient buffers available at the control unit, the use of transfer ready results in an opportunity loss.
(j) When there is a buffer shortage at the control unit, use of transfer ready due to too little credit at a channel is desirable since the control unit is not able to keep up with the link rate, anyway. Data is then held in the channel until buffers are available, reducing congestion in the storage area network and providing opportunity for path selection at the host to use other links that may be underutilized.

As a result in certain embodiments credit is maintained in the control unit on a per port basis. The basic scheme for the control unit credit mechanism is to increment the credit if the channels logged into a port might need additional credit and to decrement the credit if it begins to retry commands. As stated above, care needs to be taken to not over increment and decrement the count. The embodiments take into account bursts of I/O. Any change in credit may take a while to take effect since the control unit has to have a transport mode operation to send status for each channel and current operations are in flight. The control unit may not want to extend credit beyond its ability to move data from the adapter to cache.

In the beginning, the channels may have less credit (16) than there are buffers available. They may use it for the first I/Os and then start requiring transfer ready for the remaining. No retries should result. It is desired to get to a point where no transfer readies are required, if possible without causing retry, and to get there relatively quickly. Since there is opportunity lost when transfer ready is being used without having seen any retries, and data rate is automatically slowed when retries begin to use transfer ready, it is better to err on the side of having operations using transfer ready because of retry, and then back off to a position where retries do not occur. Therefore, buffer credit may be increased at a faster pace than it is decreased.

A goal is set to ramp up to the point of retries (or no more Transfer Ready) within 5 minutes of a workload startup. From the point of retries being required, a point of stability should be reached within an additional 3-5 minutes from there. Credit is maintained on a per port basis and all remote ports logged into a port are provided the same amount of credit. Each remote port is updated as an I/O completes for that channel and the last credit communicated is different than the desired credit.

In certain additional embodiments, credit for any port is not be incremented beyond a maximum value, nor decremented lower than a minimum value (e.g., 16). The maximum value is chosen based on buffer space available to the control unit port, the expected number of channels logged in and types of workloads expected.

In certain embodiments, a feature bit may be provided for software to detect that the feature described in these embodiments is enabled in the control unit. This is used by software to switch from using FICON for large writes to using zHPF when the features described in these embodiments is available.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 23:
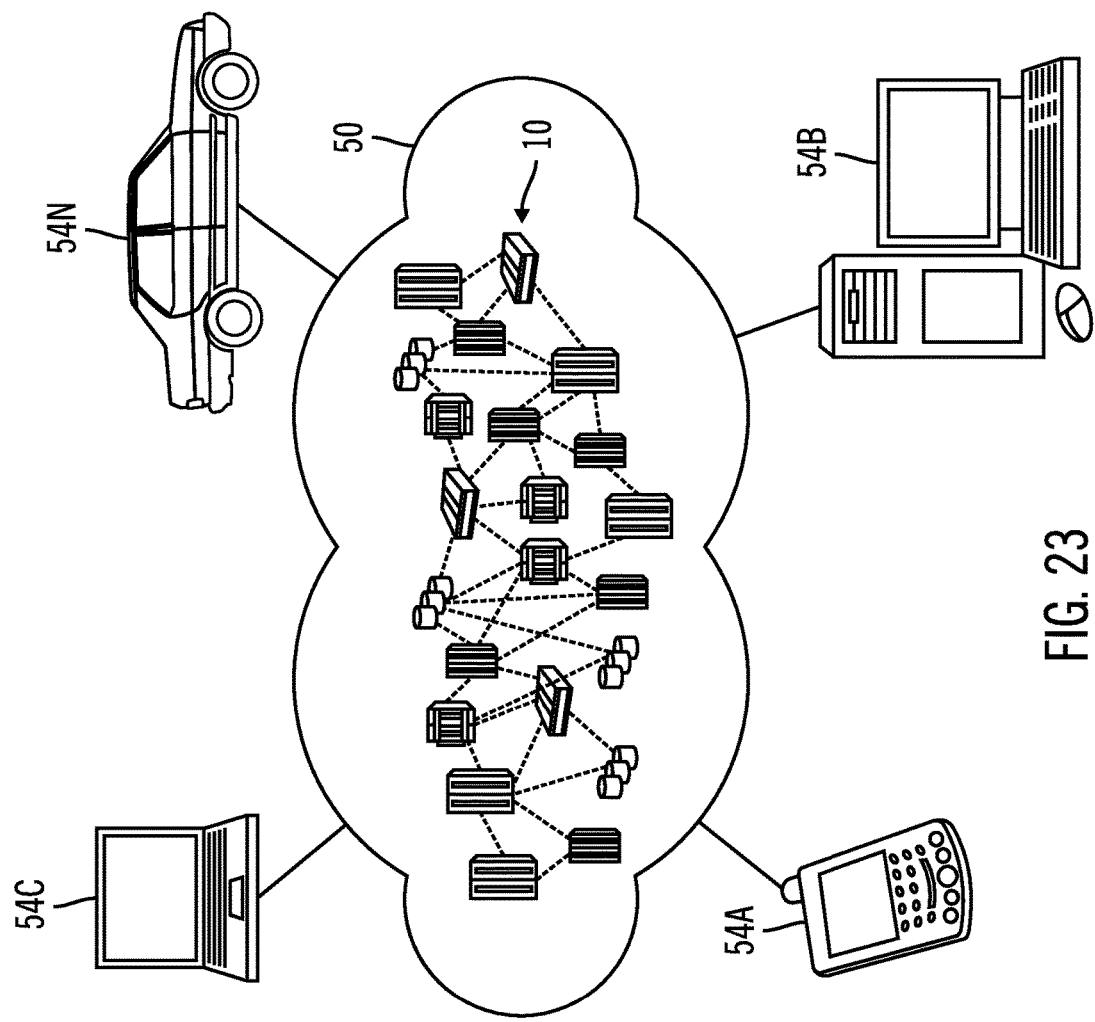
FIG. 23 illustrates a block diagram of a cloud computing environment, in accordance with certain embodiments.

Referring now to FIG. 23, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 23 are intended to be illustrative only and that computing nodes 10 and cloud computing environment 50 can communicate with any type of computerized device over any type of network and/or network addressable connection (e.g., using a web browser).

Figure 24:
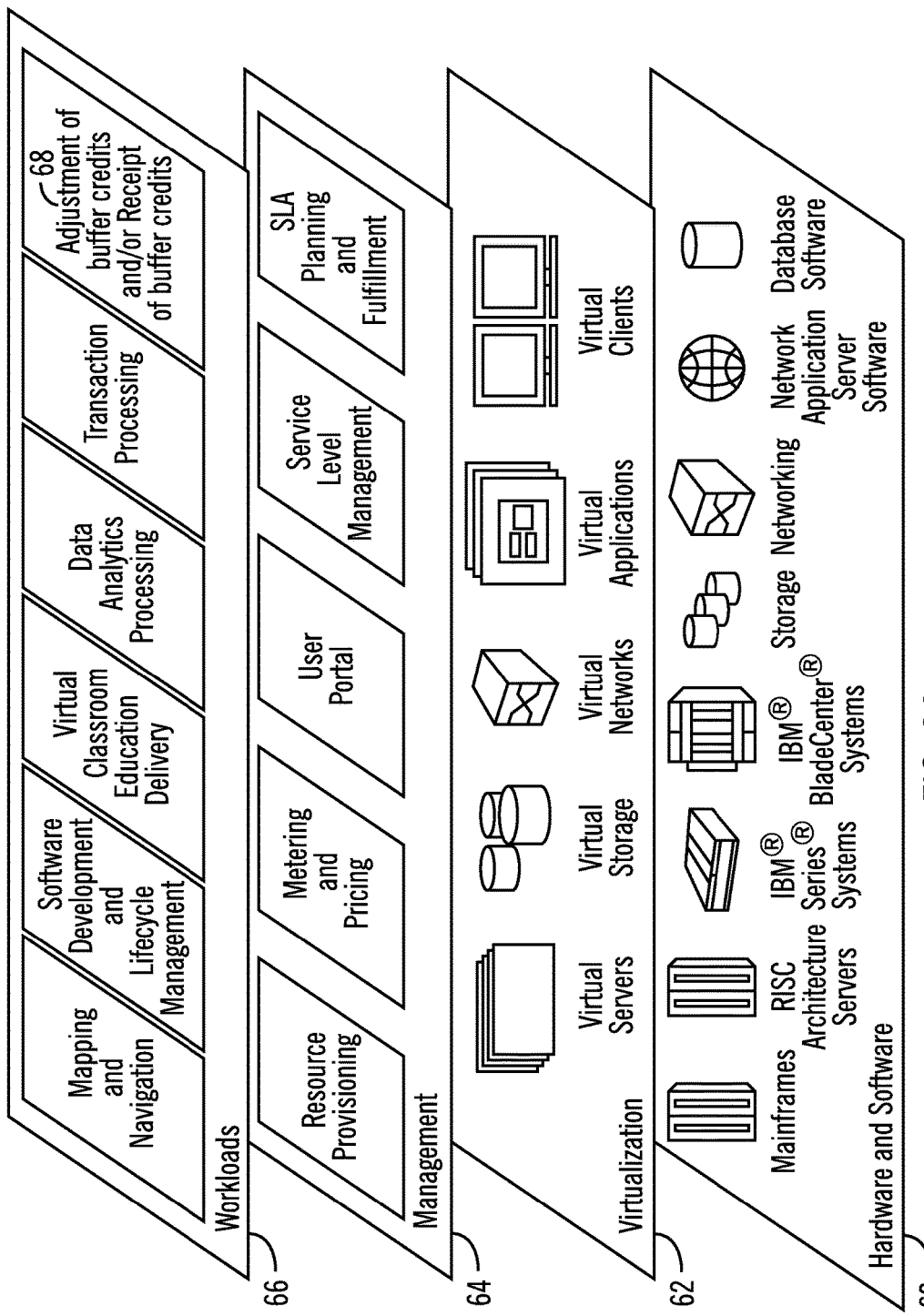
FIG. 24 illustrates a block diagram of further details of the cloud computing environment of FIG. 23, in accordance with certain embodiments.

Referring now to FIG. 24, a set of functional abstraction layers provided by cloud computing environment 50 (FIG. 23) is shown. It should be understood in advance that the components, layers, and functions shown in FIG. 24 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the adjustment of buffer credit 68 (e.g., in the control unit application 114) or the receipt of buffer credits 68 as shown in FIGS. 1-23.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 25:
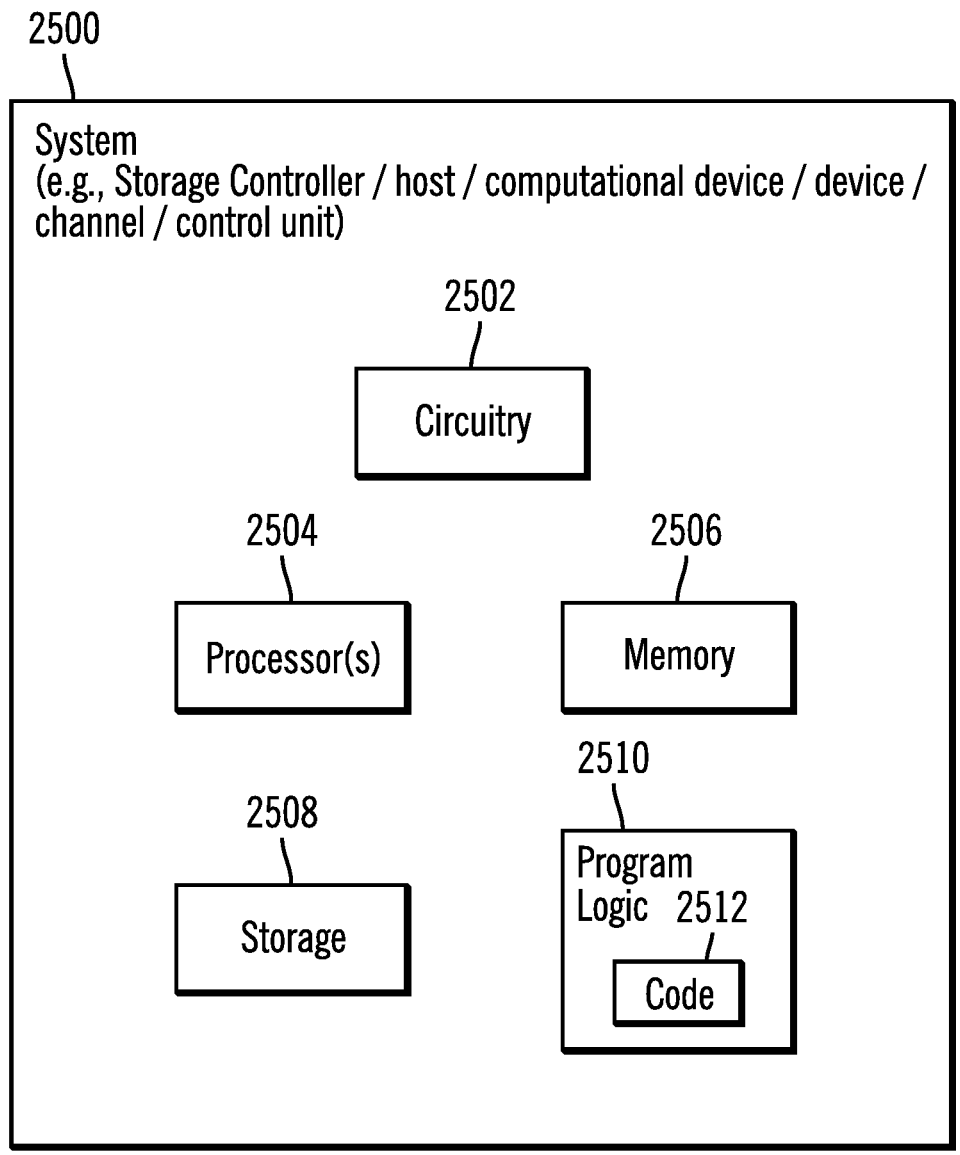
FIG. 25 illustrates a block diagram of a computational system that shows certain elements that may be included in the storage controller or the host shown in FIGS. 1, 18, 19, 20, in accordance with certain embodiments.

FIG. 25 illustrates a block diagram that shows certain elements that may be included in the hosts 110, 1802 storage controller or storage device 101, control unit 102, channels 104, 106, . . . , 108, 1804 device, or other computational devices in accordance with certain embodiments. The system 2500 may include a circuitry 2502 that may in certain embodiments include at least a processor 2504. The system 2500 may also include a memory 2506 (e.g., a volatile memory device), and storage 2508. The storage 2508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 2508 may comprise an internal storage device, an attached storage device and/or a network accessible storage device. The system 2500 may include a program logic 2510 including code 2512 that may be loaded into the memory 2506 and executed by the processor 2504 or circuitry 2502. In certain embodiments, the program logic 2510 including code 2512 may be stored in the storage 2508. In certain other embodiments, the program logic 2510 may be implemented in the circuitry 2502. Therefore, while FIG. 25 shows the program logic 2510 separately from the other elements, the program logic 2510 may be implemented in the memory 2506 and/or the circuitry 2502.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended. affiliates.

What is claimed is:

1. A method performed by a control unit configured to communicate with a plurality of channels via a switch, the method comprising:

monitoring, by a processor of the control unit, a number of transfer ready operations and a number of retry operations during a monitoring period during communication with the plurality of channels; and in response to determining that there is use of transfer ready operations but no use of retry operations during the monitoring period, and in response to determining that the number of transfer ready operations is greater than a transfer ready threshold, increasing a number of buffer credits.

2. The method of claim 1, the method further comprising:

in response to determining that the number of transfer ready operations is not greater than the transfer ready threshold, continuing to monitor the number of transfer ready operations and the number of retry operations during an additional monitoring period during communication with the plurality of channels.

3. A method performed by a control unit configured to communicate with a plurality of channels via a switch, the method comprising:

monitoring, by a processor of the control unit, a number of transfer ready operations and a number of retry operations during a monitoring period during communication with the plurality of channels; and in response to determining that there is use of retry operations but no use of transfer ready operations during the monitoring period, and in response to determining that the number of retry operations is greater than a retry low threshold, decreasing a number of buffer credits.

4. The method of claim 3, the method further comprising:

in response to determining that the number of retry operations is not greater than the retry low threshold, continuing to monitor the number of transfer ready operations and the number of retry operations during an additional monitoring period during communication with the plurality of channels.

5. A method performed by a control unit configured to communicate with a plurality of channels via a switch, the method comprising:

monitoring, by a processor of the control unit, a number of transfer ready operations and a number of retry operations during a monitoring period during communication with the plurality of channels; and in response to determining that there is use of both transfer ready operations and retry operations during the monitoring period, and in response to determining that the number of retry operations is greater than a retry high threshold, decreasing a number of buffer credits.

6. The method of claim 5, the method further comprising:

in response to determining that the number of retry operations is not greater than a retry high threshold, continuing to monitor the number of transfer ready operations and the number of retry operations during an additional monitoring period during communication with the plurality of channels.

7. A system comprising a control unit configured to communicate with a plurality of channels via a switch, the system comprising:

a memory; and a processor coupled to the memory, wherein the processor performs operations, the operations comprising:

monitoring a number of transfer ready operations and a number of retry operations during a monitoring period during communication with the plurality of channels; and in response to determining that there is use of transfer ready operations but no use of retry operations during the monitoring period, and in response to determining that the number of transfer ready operations is greater than a transfer ready threshold, increasing a number of buffer credits.

8. The system of claim 7, wherein the system is a storage controller configured to communicate with one or more hosts that include the plurality of channels.

9. The system of claim 7, the operations further comprising:
- in response to determining that the number of transfer ready operations is not greater than the transfer ready threshold, continuing to monitor the number of transfer ready operations and the number of retry operations during an additional monitoring period during communication with the plurality of channels.

10. A system comprising a control unit configured to communicate with a plurality of channels via a switch, the system comprising:
- a memory; and
- a processor coupled to the memory, wherein the processor performs operations, the operations comprising:
  - monitoring a number of transfer ready operations and a number of retry operations during a monitoring period during communication with the plurality of channels; and
  - in response to determining that there is use of retry operations but no use of transfer ready operations during the monitoring period, and in response to determining that the number of retry operations is greater than a retry low threshold, decreasing a number of buffer credits.

11. The system of claim 10, wherein the system is a storage controller configured to communicate with one or more hosts that include the plurality of channels.

12. The system of claim 10, the operations further comprising:
- in response to determining that the number of retry operations is not greater than the retry low threshold, continuing to monitor the number of transfer ready operations and the number of retry operations during an additional monitoring period during communication with the plurality of channels.

13. A system comprising a control unit configured to communicate with a plurality of channels via a switch, the system comprising:
- a memory; and
- a processor coupled to the memory, wherein the processor performs operations, the operations comprising:
  - monitoring a number of transfer ready operations and a number of retry operations during a monitoring period during communication with the plurality of channels; and
  - in response to determining that there is use of both transfer ready operations and retry operations during the monitoring period, and in response to determining that the number of retry operations is greater than a retry high threshold, decreasing a number of buffer credits.

14. The system of claim 13, the operations further comprising:
- in response to determining that the number of retry operations is not greater than a retry high threshold, continuing to monitor the number of transfer ready operations and the number of retry operations during an additional monitoring period during communication with the plurality of channels.

15. The system of claim 13, wherein the system is a storage controller configured to communicate with one or more hosts that include the plurality of channels.

16. A computer program product, the computer program product comprising a computer readable storage medium having computer readable program code embodied therewith, the computer readable program code configured to perform operations on a device configured to communicate with a plurality of channels via a switch, the operations comprising:
- monitoring a number of transfer ready operations and a number of retry operations during a monitoring period during communication with the plurality of channels; and
- in response to determining that there is use of transfer ready operations but no use of retry operations during the monitoring period, and in response to determining that the number of transfer ready operations is greater than a transfer ready threshold, increasing a number of buffer credits.

17. The computer program product of claim 16, the operations further comprising:
- in response to determining that the number of transfer ready operations is not greater than the transfer ready threshold, continuing to monitor the number of transfer ready operations and the number of retry operations during an additional monitoring period during communication with the plurality of channels.

18. A computer program product, the computer program product comprising a computer readable storage medium having computer readable program code embodied therewith, the computer readable program code configured to perform operations on a device configured to communicate with a plurality of channels via a switch, the operations comprising:
- monitoring a number of transfer ready operations and a number of retry operations during a monitoring period during communication with the plurality of channels; and
- in response to determining that there is use of retry operations but no use of transfer ready operations during the monitoring period, and in response to determining that the number of retry operations is greater than a retry low threshold, decreasing a number of buffer credits.

19. The computer program product of claim 18, the operations further comprising:
- in response to determining that the number of retry operations is not greater than the retry low threshold, continuing to monitor the number of transfer ready operations and the number of retry operations during an additional monitoring period during communication with the plurality of channels.

20. A computer program product, the computer program product comprising a computer readable storage medium having computer readable program code embodied therewith, the computer readable program code configured to perform operations on a device configured to communicate with a plurality of channels via a switch, the operations comprising:
- monitoring a number of transfer ready operations and a number of retry operations during a monitoring period during communication with the plurality of channels; and
- in response to determining that there is use of both transfer ready operations and retry operations during the monitoring period, and in response to determining that the number of retry operations is greater than a retry high threshold, decreasing a number of buffer credits.

21. The computer program product of claim 20, the operations further comprising:
in response to determining that the number of retry operations is not greater than a retry high threshold, continuing to monitor the number of transfer ready operations and the number of retry operations during an additional monitoring period during communication with the plurality of channels.

\* \* \* \* \*